US012714957B2

(12) United States Patent
Wallace et al.

(10) Patent No.: US 12,714,957 B2
(45) Date of Patent: Aug. 25, 2026

(54) RETROFITTING AND USE OF RECTANGULAR FILTERS, ASSEMBLY AND METHOD FOR FILTRATION

(71) Applicant: FILTRATION TECHNOLOGY CORPORATION, Houston, TX (US)

(72) Inventors: Christopher D. Wallace, Houston, TX (US); James D. Harris, Houston, TX (US); Tyler J. Johnson, Houston, TX (US)

(73) Assignee: FILTRATION TECHNOLOGY CORPORATION, Houston, TX (US)

(*) Notice: Subject to any disclaimer, the term of this patent is extended or adjusted under 35 U.S.C. 154(b) by 392 days.

(21) Appl. No.: 18/473,091

(22) Filed: Sep. 22, 2023

(65) Prior Publication Data

US 2024/0082761 A1 Mar. 14, 2024

Related U.S. Application Data

(63) Continuation of application No. 17/098,036, filed on Nov. 13, 2020, now abandoned, which is a continuation-in-part of application No. 16/112,023, filed on Aug. 24, 2018, now abandoned, and a continuation-in-part of application No. 15/901,580, filed on Feb. 21, 2018, now Pat. No. 11,364,458.

(60) Provisional application No. 62/550,096, filed on Aug. 25, 2017, provisional application No. 62/462,327, filed on Feb. 22, 2017.

(51) Int. Cl.

*B01D 53/22* (2006.01)
*B01D 29/33* (2006.01)
*B01D 29/52* (2006.01)
*B01D 29/96* (2006.01)
*B01D 35/30* (2006.01)
*C02F 1/00* (2023.01)
*C02F 103/42* (2006.01)

(52) U.S. Cl.

CPC ......... *B01D 35/306* (2013.01); *B01D 29/333* (2013.01); *B01D 29/52* (2013.01); *B01D 29/96* (2013.01); *C02F 1/001* (2013.01); *B01D 2201/12* (2013.01); *B01D 2201/296* (2013.01); *C02F 2103/42* (2013.01); *C02F 2201/006* (2013.01)

(58) Field of Classification Search

CPC .... B01D 35/306; B01D 29/333; B01D 29/52; B01D 29/96; B01D 2201/12; B01D 2201/296; C02F 1/001; C02F 2103/42; C02F 2201/006

See application file for complete search history.

(56) References Cited

U.S. PATENT DOCUMENTS 2,359,138 A * 9/1944 Martin .................. D06F 43/085 210/167.01
2,508,297 A * 5/1950 Ruth ......................... F01N 3/04 55/319
2,909,285 A * 10/1959 Besler .................... B01D 29/94 210/330
2,979,311 A * 4/1961 Bungas ..................... F24F 1/00 165/121
3,217,888 A * 11/1965 Fuchs .................... B01D 24/08 210/318
3,250,063 A * 5/1966 Andrews ................ B01D 46/10 55/504
3,250,242 A * 5/1966 Pekarek ............... B01D 35/143 210/DIG. 17

(Continued)

*Primary Examiner* — Anthony Shumate

(74) *Attorney, Agent, or Firm* — Boulware & Valoir PLLC

(57) ABSTRACT

An adaptor device for retrofitting in a filter housing is disclosed. The adaptor device allows the filter to be retrofitted with a plurality of filter elements, thereby improving its filtering efficiency.

6 Claims, 16 Drawing Sheets

(56) References Cited

U.S. PATENT DOCUMENTS

| | | | | |
|---|---|---|---|---|
| 3,568,412 | A * | 3/1971 | Wallace | B01D 46/02 91/1 |
| 3,698,161 | A * | 10/1972 | Brixius | B01D 46/02 55/486 |
| 3,840,402 | A * | 10/1974 | Robert | B01D 46/79 134/29 |
| 4,632,755 | A * | 12/1986 | DeGraffenried | B01D 29/15 210/488 |
| 5,145,033 | A * | 9/1992 | Bedi | B01D 35/306 184/6.24 |
| 5,776,341 | A * | 7/1998 | Barnard | B01D 35/027 210/462 |
| 7,523,603 | B2 * | 4/2009 | Hagen | F01K 21/047 422/607 |
| 2005/0120687 | A1 * | 6/2005 | Casey | B01D 50/20 55/423 |
| 2008/0185323 | A1 * | 8/2008 | Kargenian | B01D 69/10 210/323.1 |
| 2009/0321339 | A1 * | 12/2009 | Suzuki | B01D 29/96 210/232 |
| 2013/0048549 | A1 * | 2/2013 | Burrows | C02F 1/441 210/232 |
| 2018/0017298 | A1 * | 1/2018 | Dziubinschi | B01D 15/26 |
| 2021/0060465 | A1 * | 3/2021 | Wallace | B01D 17/10 |
| 2021/0252445 | A1 * | 8/2021 | Mori | F24F 13/28 |
| 2021/0331104 | A1 * | 10/2021 | Gregerson | B01D 35/306 |

* cited by examiner

RETROFITTING AND USE OF RECTANGULAR FILTERS, ASSEMBLY AND METHOD FOR FILTRATION

PRIOR RELATED APPLICATIONS

This application is a Continuation of U.S. application Ser. No. 17/098,036, filed Nov. 13, 2020, which is a Continuation-In-Part of U.S. application Ser. No. 16/112,023, filed Aug. 24, 2018, which claims priority to U.S. provisional application Ser. No. 62/550,096 filed Aug. 25, 2017; application Ser. No. 17/098,036 is also a Continuation-In-Part of U.S. application Ser. No. 15/901,580, filed Feb. 21, 2018, which claims priority to U.S. provisional application Ser. No. 62/462,327, filed Feb. 22, 2017, all of which are incorporated herein in their entirety for all purposes.

FIELD OF THE DISCLOSURE

The disclosure generally relates to an assembly to accommodate rectangular or wedge shaped filters in a filter housing for filtering liquids, for example in pool and spa applications. The filter media may be pleated media therein that are capable of high efficiency filtration as well as easy replacement of the filter element. The rectangular or wedge-shaped filters can also be used to filter many types of fluids and fluid mixtures.

BACKGROUND OF THE DISCLOSURE

As the filter of choice for most spas and many smaller above ground pools, the cartridge filter is enjoying a resurgence in popularity. The cartridge filter element, an aquatic version of the pleated filters traps dirt and particles of 25-100 microns or larger in size. After a period of use, the filter requires cleaning to function properly. To clean the filter, the cartridge is removed from the tank and hosed thoroughly, top to bottom, often with a garden hose. This is done as necessary to remove dirt typically when the pressure gauge rises 8-10 lbs. and above and the fluid cannot flow at a proper rate through the filter.

The life of filter cartridge depends on the condition under which it is used, and may range from 1 to 3 years depending on the maintenance schedule. Regularly maintenance is also required to prevent or mitigate clogging. As a filter ages, the length of time between necessary cleanings becomes shorter due to algae bloom or particle build up.

Currently, most current pool filters are designed to use a single cylindrical filter cartridge, or up to four cylindrical filter cartridges. For efficiency purposes, increasing the filter surface area provides higher filtering efficiency. This cylindrical cartridge design does not provide the highest surface area available inside the housing. In the case of four cylindrical filter cartridges, unused spaces inside the filter housing are created naturally by the geometry of the housing and the cartridges. Additionally, cylindrical filter cartridges used inside a cylindrical filter housing inevitably leaves unused dead space within the housing.

Therefore, there is the need for an improved filter design for pool and spa applications with smaller footprint, higher filtration performance while being easy to maintain or replace.

There is also the need for an after-market modification that can readily transform a cylindrical cartridge filter system into a multi-cartridge filter system.

Industrial filtration systems generally comprise cartridge filters located within corresponding filter housings, and fluids to be filtered (influents) are introduced into the filter housings and filter elements for the removal of debris, contaminants and particles. These cartridge filters generally have a cylinder shape with a hollow core. Influents are supplied either to the hollow core and flowing outwards through the media of the cartridge filters (inside to outside) or the influent flows from the outside of the filter into a core (outside to inside flow), leaving debris, contaminants and particles at the surface of the media. The cylindrical cartridge filters of pleated media, while easy to manufacture and use, do not effectively utilize the space inside the filter housing.

Therefore, there is a need for a new filter element and corresponding filter configuration to increase the volume of fluid that can be filtered in the same size filter housing, or provide a filter system that can filter the same volume of fluid or even more in a smaller housing. The new assembly can be installed in the commonly used cylindrical filter housing, but can also be used with filter housings of different shapes that will accommodate a rectangular filter such as a square or rectangular filter housing.

SUMMARY OF THE DISCLOSURE

This disclosure is an efficient filter assembly that can also include an adaptor device that transforms a single cylindrical-cartridge filter vessel or a quadruple-cartridge filter vessel as used in the pool and spa application into a multi-filter element device in order to increase the filter surface area over the same vessel, improve filtration performance, and reduce the difficulty to service or replace the filter cartridges. With the adaptor device, the conventional pool and spa filter housing that uses cylindrical filter cartridges can be readily converted to use rectangular- or wedge-shaped filter elements. These rectangular or wedge-shaped filter elements can effectively reduce the dead space inside the filter housing, thereby increase the filtration surface area and improve filtration efficiency and reducing the energy and maintenance cost.

In one aspect of this disclosure, a filter system is described, comprising: a filter housing; a fluid inlet to the filter housing; a clean fluid outlet from the filter housing; a separation plate located inside the filter housing, said separation plate having a center hole in communication with the clean fluid outlet; e an adaptor plate located in the filter housing, wherein the adaptor plate is located above the separation plate, and at least one spacer is provided between said separation plate and said adaptor plate, wherein a plurality of outlet ports are provided on said adaptor plate; a plurality of filter elements enclosed in the filter housing, each filter element comprising a central void surrounded by a filter media for outside to inside flow, wherein each filter element is mounted on the adaptor plate at one of said outlet ports.

In another aspect of this disclosure, an adaptor device for retrofitting in a filter housing is described, wherein the pool filter housing has a fluid inlet, a fluid outlet, and a separation plate located inside the filter housing. The adaptor device comprises: an adaptor plate sized to be placed inside the filter housing, wherein a plurality of outlet ports are provided on said adaptor plate to allow fluid to flow through the adaptor plate; and at least one spacer between the separation plate and the adaptor plate.

In one embodiment, the media of the filters is pleated filter media in a trapezoidal shape with top and bottom sides parallel to each other and the longer sizes in between the top and bottom flaring out such that the bottom side is wider than the top side, the central void being created by the pleated media inside the trapezoid extending from the top side to the bottom side, wherein each said filters further comprising a solid generally rectangular top cap that is secured to the top side of the pleated media to maintain a rectangular profile of the filter; a generally rectangular bottom cap secured to the bottom side of the pleated media with a central opening that communicates with the central void in the pleated media; and the bottom cap is a wider rectangle to accommodate the flare of the trapezoidal media. In another embodiment the media is a rectangular shape.

In one embodiment, the filter elements are wedge shaped filter elements, and a plurality of the wedge shaped filter elements are enclosed in the filter housing in a generally circular arrangement with each of said wedge shaped filter elements having a central void surrounded by filter media, a solid top cap, a bottom cap with an opening located therein to communicate with the central void in the filter media that extends from the top cap to the bottom cap; the bottom cap of each said wedge shaped filter is mounted on the adaptor plate at one of the outlet ports such that the fluid to be filtered passes through a layer of filter media into the central void of the wedge shaped filter element and filtered fluid passes through the opening in the adaptor plate.

In one embodiment, a handle is provided on the top cap of each of the filter elements.

In one embodiment, the filter system further comprises a guide support mounted at each of the outlet ports on the adaptor plate. In one embodiment, the guide support is perforated, and wherein the guide support extends into the central void of the filter element. In one embodiment, the each of the guide supports is detachably fastened or mounted to the adaptor plate.

In one embodiment, the media is selected from the group of natural media, synthetic media, ceramic media, glass media and metal media. In one embodiment, the filter media is selected from the group of pleated or non-pleated media. In one embodiment, the filter media is a polyester spun-bonded pleated media.

In one embodiment, the filter elements have openings in both the top cap and the bottom cap. Therefore, to properly seal the top cap during operation, the filter assembly further comprises a plate or a spider cap placed above the filters inside the filter housing. The plate is secured over the top cap of the filters to prevent fluid entry once the filter housing is closed. Alternatively a spider cap that has radiating arms from a central hub and arms generally contacting the top cap of each of the filter elements can be used when a circular array of filters such as wedge shaped filters are use; and a mechanism between the plate or spider cap and the inside of the top of the housing to secure the spider plate over the filters when the filter housing is in use.

The generally rectangular shaped filter of this disclosure comprises a rectangular shaped top cap, a rectangular shaped bottom cap, and filter media extending between the top cap and the bottom cap. The filter media can be pleated or non-pleated depth media. The pleated filter media can be a single sheet of filter folded into pleats and connected to provide a central void inside the pleats without other openings or bypass. The pleated media can have multiple layers of the same or different materials depending on the desired filter. Two rows of pleats are formed along the longer sides of the rectangle. At the shorter end of the rectangle there can be one layer of non-pleated media or small pleats. The rectangular arranged pleated media creates a central void. The bottom cap has a central outlet communicating with the central void created by the pleated media. A filter support can also be provided within the inside the central void to maintain the longitudinal integrity of the filter elements, as well as guiding the insertion of the filter elements. The filter support is preferably made of a rigid material. The filter support can be perforated to allow fluid flow inside the void created by the pleated media. The top cap also can have a handle for easier insertion/removal of individual filter elements and the handle can fold down on the top cap. In some embodiments, the rectangular filter element may have openings in the top and/or bottom cap. A separate cover for the top opening or hold-down mechanism, such as a spider cap, may be provided to seal off the opening in the top of the filter.

When a filter vessel does not need to be fitted with an adaptor, this invention includes the filter assembly utilizing a plurality of rectangular shaped filter elements in a filter housing (also referred to as a vessel) that is typically cylindrical, but could be used with filter housings of different shapes that will accommodate a rectangular filter such as a square or rectangular filter housings. This description will refer to the typical cylindrical housing, but other shapes may be used. A plurality of the rectangular shaped filter elements are arranged compactly inside a filter housing with space for fluid flow around and in between the filter elements.

In another embodiment, three-dimensional wedge-shaped filter elements are used in place of the cylindrical filter cartridge or multiple cylindrical cartridges. The three-dimensional wedge-shaped filter element in this disclosure comprises a wedge-shaped top cap, a wedge-shaped bottom cap, and pleated filter media extending between the top cap and the bottom cap. The filter media can be a single sheet of filter media folded into pleats, providing a central void inside the pleats for the filtered fluid. The pleated filter media extends from the wedged shaped top cap to the wedge-shaped bottom cap. Both caps have side edges the approximate same length and shorter end and longer end to form a wedge. Two rows of pleats gradually decreasing in size from larger to smaller pleats extends from the longer end of the wedge to the smaller end of the wedge with at least one layer of media connecting the outer most largest pleats and the smallest inner pleats providing continuous layer of media forming a central void inside the pleats which can be wedge, triangular or round depending on the pleat configuration. The pleated filter media can be a single sheet of filter folded into pleats, providing a central void inside the pleats. The pleated media can have multiple layers of the same or different materials depending on the desired filter. In some embodiments, the media does not need to be pleated and can be solid media. The bottom cap has a central outlet communicating with the central void created by the pleated media through which the effluent or clean fluid passes. A filter support can also be provided inside the void, extending also from the top cap to the bottom cap to maintain the longitudinal integrity of the filter elements, as well as guiding the insertion of the filter elements. The filter support can be perforated to allow fluid flow inside the void created by the pleated media. The top cap also may have a handle for easier insertion/removal of individual filter elements. In some embodiments, the wedge-shaped filter element may have openings in the top and/or bottom cap. A separate cover for the top opening or hold down mechanism may be provided to seal off the opening in the top of the filter.

In this disclosure, the rectangular shaped filter element can be replaced with a wedge-shaped filter element in order to increase the surface area of filters, provided that ports or openings in the adaptor plate are configured according to the type and number of filter element used for outflow of clean fluid.

The filter elements are arranged to maximize the filtration area inside the filter housing, which also increases the filter capacity, i.e. the amount of fluid the filter is capable of filtering at a given time. The filter housing has fluid inlet for fluid to enter into the housing that contains the plurality of rectangular shaped filter elements. A conventional separation plate or manifold is provided inside the filter housing sealably secured to the outlet. The conventional separation plate is designed for a cylindrical cartridge filter system, having a central hole to accommodate the cylindrical filter cartridge. The conventional filter housing has the separation plate located near the bottom of the housing to support a manifold that is fluidically connected to a clean fluid outlet. Alternatively, for a conventional filter housing that has four cylindrical cartridges, a manifold having sealed connection with both the cartridges and the clean fluid outlet is placed at the bottom of the filter housing.

In the case of a separation plate, after installing the adaptor plate and spacer on top of the separation plate, the cylindrical filter cartridge can be converted into a multi-cartridge filter system. The adaptor plate being close to the separation plate with spacer in between the two plates, therefore the space inside the filter housing remains available for installing a plurality of filter elements. The spacer is preferably a ring with substantially the same circumference as the inner circumference of the filter housing, and with the spacer between the adaptor plate and the separation plate, any fluid flowing through the ports in the adaptor plate would then be directed to the central hole of the separation plate, thus maintaining the filtration efficiency.

In the case where a conventional hollow manifold is used to receive and connect with multiple cylindrical filter cartridges, an adaptor manifold can be used. The adaptor manifold of this disclosure comprises a plurality of openings matching the rectangular- or wedge-shaped filter elements, and each opening is in fluid communication with a connection port on the other side of the manifold. The connection port sealingly couples with the clean fluid outlet of the filter housing, such that the water-to-be-filtered enters the filter housing through the inlet, undergoing an outside-in filtration through the rectangular- or wedge-shaped filter elements, and finally the filtered water flows through the manifold and exits the filter housing through the clean fluid outlet. The adaptor manifold of this disclosure can replace the conventional manifold entirely, as the adaptor manifold can be manufactured to fit with existing housing and clean fluid outlet.

For adaptor plates, filter receivers are mounted thereon, which provides a plurality of ports allowing fluid to flow through the adaptor plate. The rectangular shaped filter elements are inserted or otherwise secured in filter receivers that also have openings that communicate with the opening in the bottom caps. The ports in the adaptor plate communicate with the openings in the filter receivers. The filter supports are mounted on the filter receivers and extend into the central void of each rectangular shaped filter without hampering fluid flow from the central void of the rectangular shaped filter and through the openings in the separation plate.

The rectangular shaped filter may include a mesh enclosing the filter media. The dirty fluid is introduced into the filter housing through a fluid inlet. The fluid then passes through the filter media into the central void of the rectangular shaped filters and the filtered fluid passes through the opening in the bottom cap and the corresponding opening in the separation plate. A chamber is provided in the filter housing below the separation plate to collect the filtered clean fluid. A clean fluid outlet in the filter housing is located in this chamber for allowing the filtered fluid to collect and remove clean fluid from the filter housing. This embodiment is used for outside to inside flow.

This invention also includes methods for filtering fluid by introducing fluid to be filtered into a filter housing with a plurality of rectangular or wedge-shaped filters for pool and spa applications. Then, passing the fluid through filter media of the rectangular shaped filters into a central void provided therein. Further collecting the filtered fluid from the central void of each rectangular shaped filter into an adaptor manifold or an adaptor plate, followed by removing the filtered fluid from the filter housing. Alternatively, the fluid introduced into the filter housing can be introduced into a central void located in each of the rectangular shaped filters and further passed through a layer of media surrounding the void. The fluid is collected from the filter housing and recirculated with a pump to the pool.

As used herein, "influent" or "dirty fluid" or "dirty water" means the fluid to be introduced to and filtered by the filter.

As used herein "inside to outside flow" means fluid flowing from the inside of a filter to the outside of the filter and can be used interchangeably with "inside to out" or "inside out".

As used herein "outside to inside flow" means fluid flowing from the outside of a filter to the inside and can be used interchangeably with "outside in".

As used herein, "effluent" or "clean fluid" means the clean filtered water already passing through the filter media.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

DETAILED DESCRIPTION

Figure 1A:
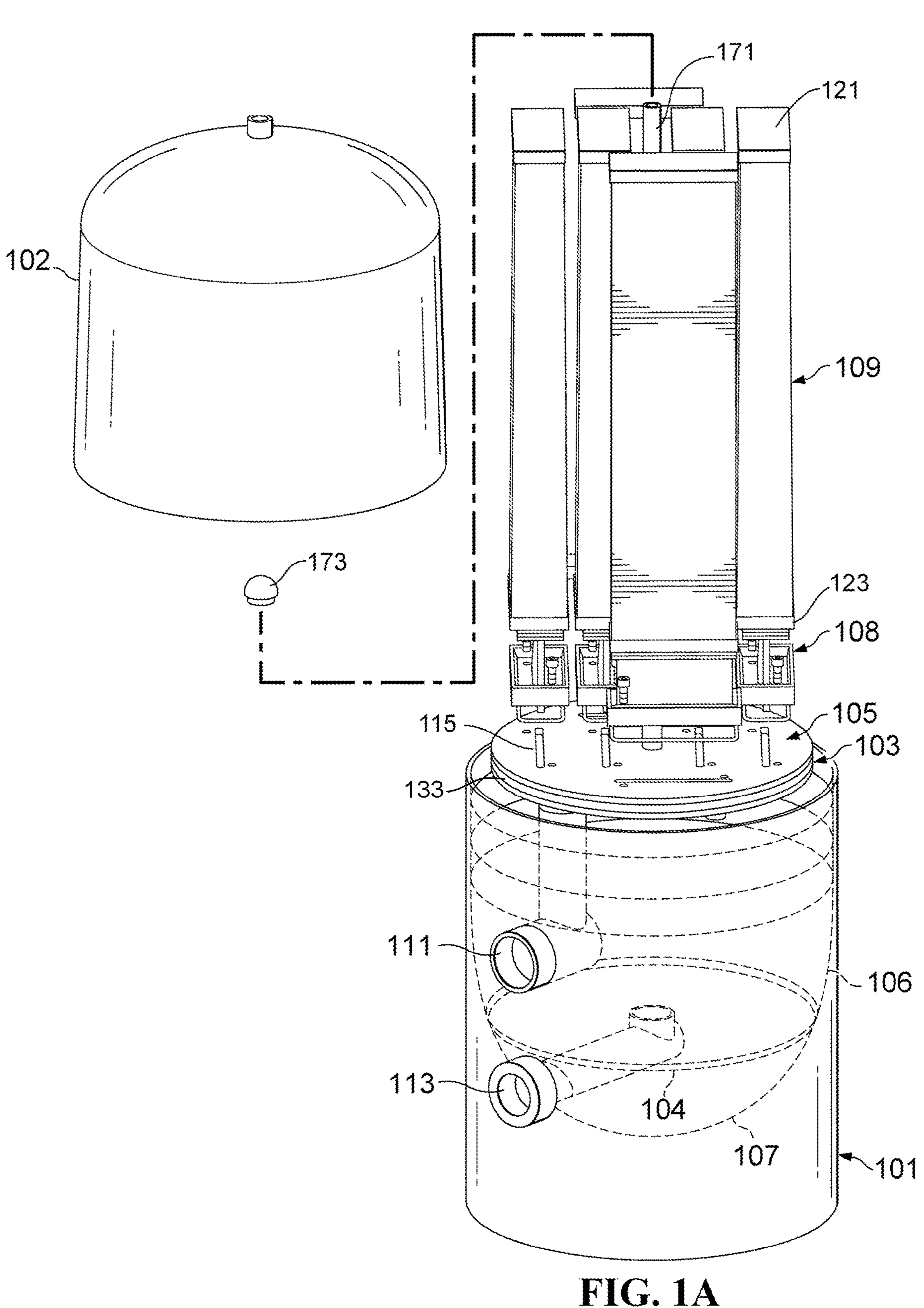
FIG. 1A shows the adaptor plate used with a conventional separation plate in a pool or spa filter housing.

The present disclosure describes a novel retrofitting adaptor assembly to be used in a conventional single cylindrical cartridge or multiple cylindrical cartridge pool filter systems. The water in pool and spa applications is continuously filtered with the pumping system is turned on. In a typical pool and spa filtration system there is a strainer through which the water passed that catches larger debris such as leaves prior to entering the filter vessel. Then the water is pumped into a filter vessel. This detailed description illustrates the adaptation of the filter housing that uses a single filter vessel as well as the version with multiple cylindrical filters. Alternatively, the internal parts of a filter housing can be modified to adopt different designs. In the case of a newly built pool or spa, the filter housing does not need to be retrofitted.

The detailed explanation of the assembly and method of this invention may be made with reference to the drawings. The drawings are also illustrative and not necessarily to scale. The size of the rectangular shaped filters used in this invention can be made to the desired size according to needs. The following examples are intended to be illustrative only, and not unduly limit the scope of the appended claims.

Please refer to FIG. 1A which is an exploded view of the disclosure, which shows the adaptor plate 105 as used in a conventional cylindrical cartridge pool filter system that comprises: a filter housing 101 having a removable top 102 of the filter housing that provides access to the filters for cleaning; an inlet 111 for introducing fluid to be filtered, in this case pool and spa water that is located above a separation plate 103 and adaptor plate 105 further described below; an outlet nozzle 113 for discharging filtered clean water. The separation plate 103 is placed about the inner circumference of the filter housing shown at 104 in the exploded view and the separation plate 103 would support a conventional cylindrical filter cartridge (not shown). A spacer 133 (discussed in more detail in FIG. 1C) is provided between the separation plate 103 and the adaptor plate 105 to allow fluid communication between the plates. The conventional single or quadruple cylindrical filter cartridge(s) typically has a central void surrounded by cylindrical filter media, a top cap that covers one end of the cylindrical filter media, and a bottom cap that surrounds the cylindrical filter media to maintain the shape of the cylindrical filter and has a central opening in the cap to allow for outside to inside flow through the filter. There is fluid communication between the central void of the filter cartridge and the central hole of the separation plate. The retrofitting adaptor plate 105 of this disclosure is placed in the housing 102 just slightly above 104 where the separation plate 103 is located to allow fluid flow, and has openings that match the end caps of the plurality of rectangular filter elements shown in FIG. 1A.

As seen in FIG. 1A, there are six (6) rectangular-shaped filter elements 109 arranged inside the tubular housing 101. Each filter element 109 has a top cap 121 and a bottom cap 123 respectively located at the top and bottom of the filter media to maintain the shape and integrity of the filter element 109, and avoid any fluid bypass by securing the filtration media to the top and bottom caps. Also provided for each filter element 109 is a generally rectangular receiver 108 mounted on the adaptor plate 105 for the end cap of each filter element. The receiver 108 may have a filter support 125 which is a rigid material extending from and secured to the base of the receiver sized to fit inside the void of the filter element 109 (shown in FIG. 1B) for easily inserting the filter element 109 and securing to the adaptor plate 105. The filter supports preferably allow fluid flow through the rigid material. The adaptor plate 105 has six (6) outlet ports 115 into which the receiver 108 can be inserted. Details of the filter element 109 and the receiver 108 will be described below with regard to FIGS. 2A-F. By retrofitting the conventional pool filter housing with the adaptor plate 105, six rectangular-shaped filter elements 109 can now be used to improve filtration efficiency without having to change the entire filtration system.

To release any trapped air inside the housing, a vent tube 171 and corresponding air screen 173 are also provided inside the housing.

Figure 1B:
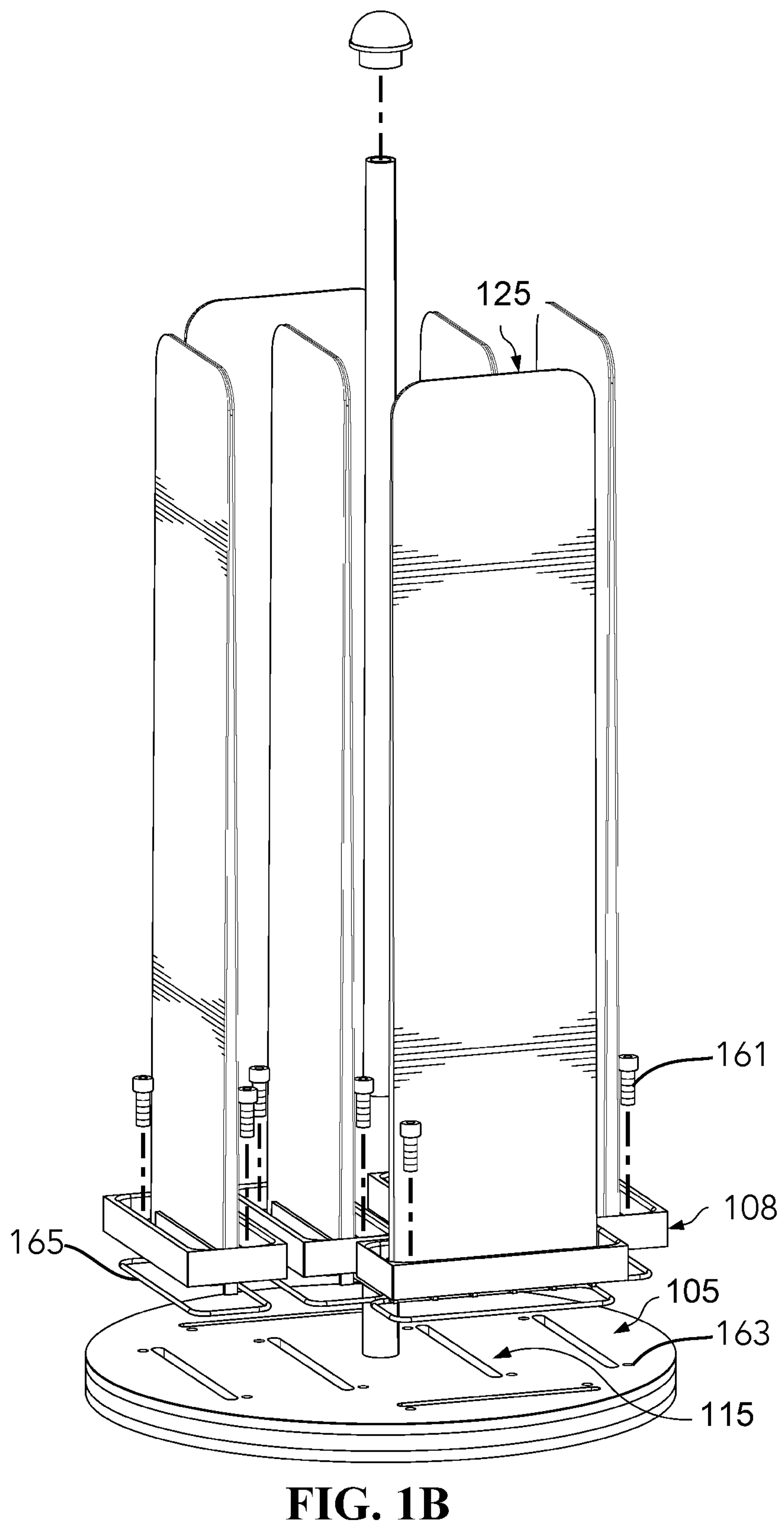
FIG. 1B is a perspective view showing a plurality of filter supports mounted on the adaptor plate through receivers.

Please refer to FIG. 1B, which shows a plurality of filter supports 125, each mounted on the adaptor plate 105 through a corresponding receiver 108. The adaptor plate 105 has a plurality of ports 115 arranged in a predetermined pattern that allows the installation of corresponding filter elements. Each of the receiver 108 is secured to the adaptor plate 105 by using bolts 161 and bolt holes 163 on the adaptor plate 105. However, the receiver 108 may be secured preferably removably to the adaptor plate 105 by other means known to persons having ordinary skills in the art. An O-ring seal 165 is also provided between each receiver 108 and the adaptor plate 105 in order to ensure no water leakage between the two.

The filter supports 125 are flat and sized to be inserted into a central void of the filter element 109. The matching size and shape of the filter support 125 and the central void of the filter element 109 allows a user to easily align the filter element 109 into the correct position. In one embodiment, the filter support 125 is it remains in the filter housing as an integral of the filter assembly, as opposed to being disposable along with the filter cartridges to be disposed of.

Figure 1C:
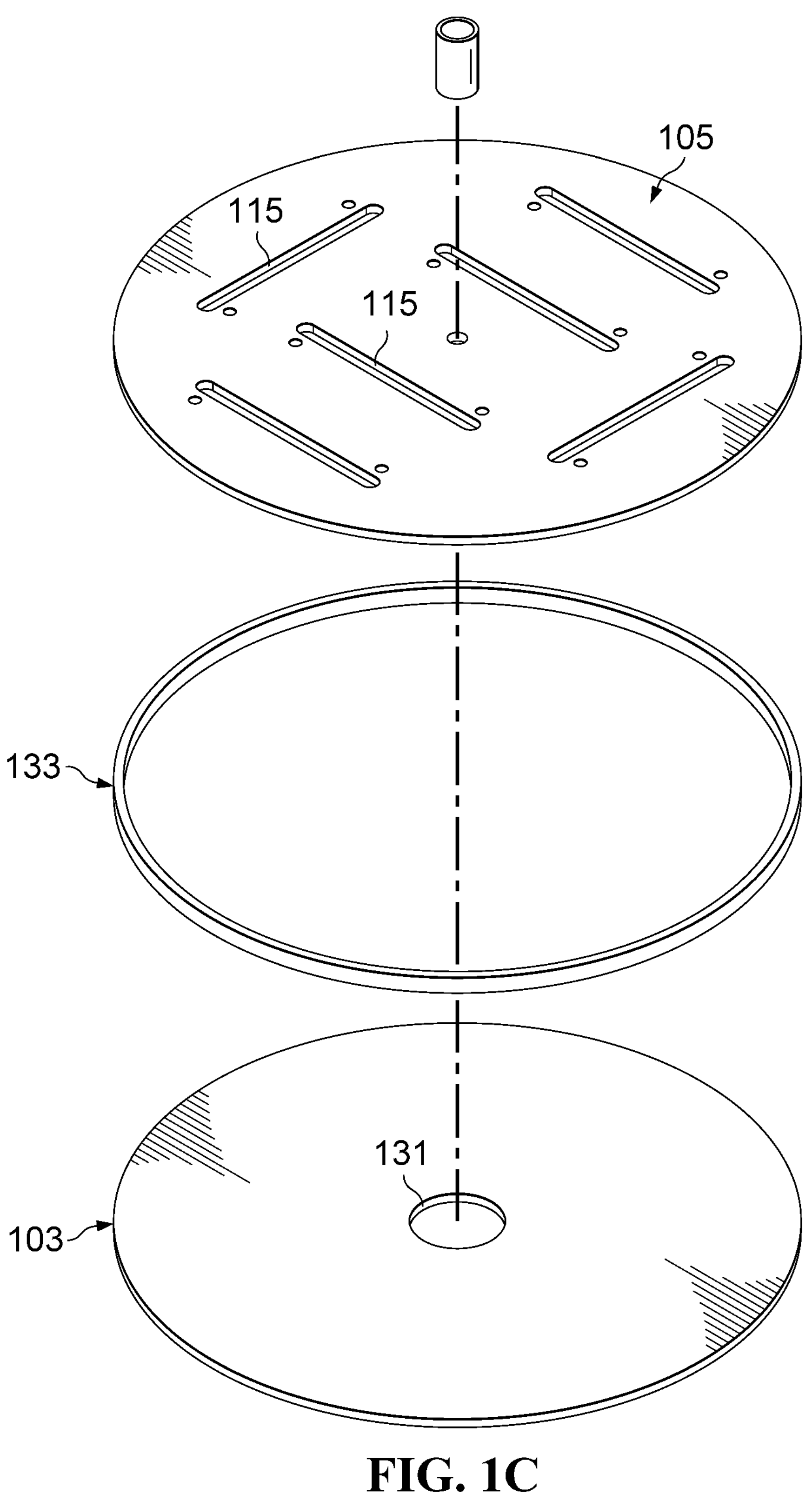
FIG. 1C is a perspective view showing the relationship between the adaptor plate and the separation plate.

Referring now to FIG. 1C, which shows the relationship between the adaptor plate 105 and the separation plate 103. As can be seen, a spacer ring 133 is placed between the separation plate 103 and the adaptor plate 105. The spacer ring 133 provides sufficient space between the two plates 103, 105, such that when the adaptor plate 105 is retrofitted in a filter housing, the fluid flowing through the ports 115 can coalesce and flow through the central hole 131 of the separation plate 103. Without the spacer ring, the minimum space between the plates 103, 105 would not allow fluid flowing through the ports in the adaptor plate 105 to quickly flow through the central hole of the separation plate 103. If the distance between the plates is too large, there would be less space available inside the filter housing for the filter elements.

Figure 1D:
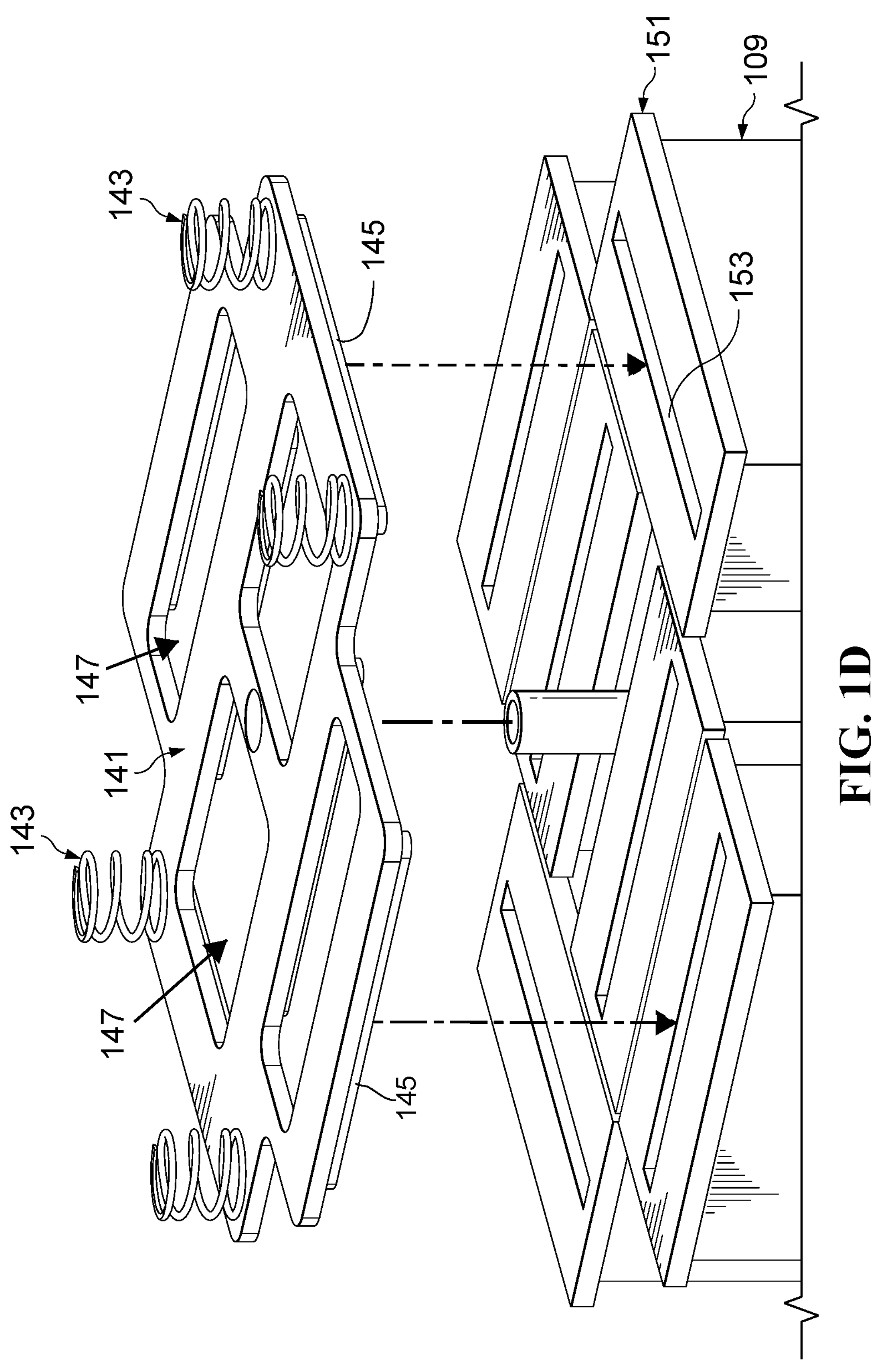
FIG. 1D is a perspective view showing a spider cap placed on top of the rectangular filter elements.

Referring now to FIG. 1D, which shows the alternative embodiment where a closure plate 141 is used. In this embodiment, each of the filter element 109 has an open top cap 151, manufactured with an opening 153. Here both the open top cap 151 and bottom cap (not shown) have an opening so that a user can easily install the filter element into the filter housing. However, to provide for outside-to-inside flow, the top cap must be securely covered to block flow into the top cap. The closure plate 141 is designed to cover the openings 153 of the top cap 151 of each filter element 109. Specifically, the closure plate 141 further comprises a protrusion 145 corresponding to each filter that is shaped and sized to fit snuggly into the openings 153 on the top caps 151 to completely cover the openings 153. Optionally, several cutouts 147 can be provided on the closure plate 141 for a user to easily see the top caps and place plate 141 to cover the openings 153 accordingly. A plurality of springs 143 are also provided such that when the filter housing is closed, sufficient force is applied to the closure cap 141 to ensure that the openings 153 on the top caps 151 will be covered. However, other mechanical closures may be used as known to this skilled in the art.

Figures 2A, 2B, 2C:
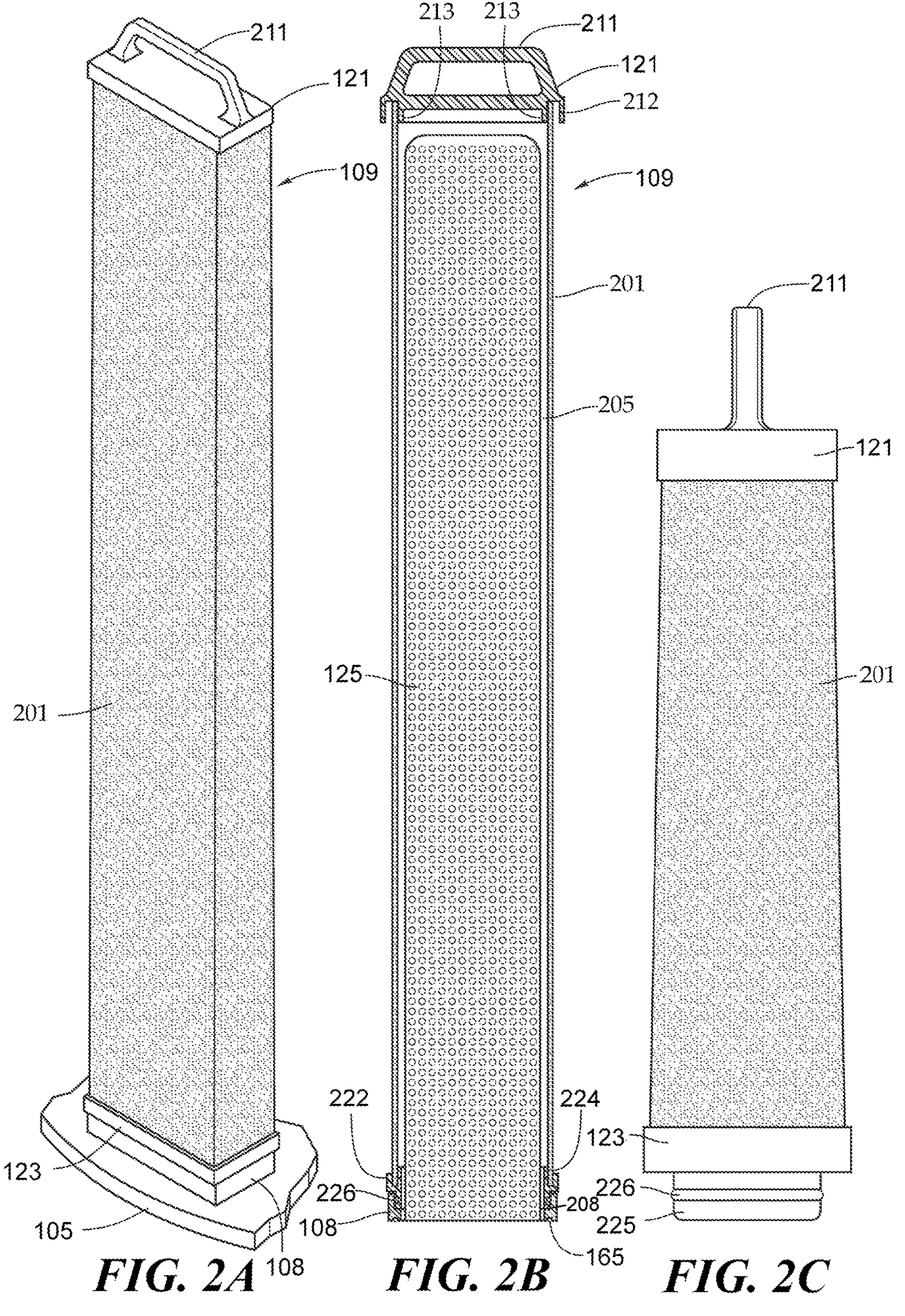
FIG. 2A is a schematic perspective view of a rectangular shaped filter element of this invention.
FIG. 2B is a cut away cross section wherein pleated filter media is cut out to reveal the perforated support.
FIG. 2C is a side view of a preferred embodiment showing a trapezoid-shaped filter element wherein the width of the filter element is gradually increased toward the bottom.

Also referring to FIGS. 2A-C, which show the perspective views of the rectangular shaped filter element 109. The rectangular shaped filter element 109 is generally comprised of a top cap 121, a bottom cap 123, and the media 201 extending from the top cap 121 to the bottom cap 123. The top cap 121 is optionally provided with a handle 211 that can be folded on top of the cap and provide a more compact profile for the installed rectangular shaped filter. The filter media 201 is preferably pleated to increase filtration area and filtration capacity. There is central void in the media surrounded by media (not shown in FIG. 2A). The rectangular shaped filter is mounted on the adaptor plate 105 in a rectangular shaped filter receiver 108 that has lips 208 extending upwardly from the adaptor plate to receive the outlet connector 225 on the bottom cap.

The filter media material is not limited and can be customized depending on the type of filtration. The media may be pleated media of cellulose and other natural media or synthetic media including but not limited to polypropylene, polyester, nylon, PTFE, PPS, ECTFE and PVDF. The pleated media may be one layer of material or multiple layers of different materials depending on the needs for filtration or separation. Other types of media including non-pleated depth media polypropylene, polyester, nylon, PTFE, PPS, PVDF, ECTFE, cellulose fiber, glass fiber, and woven wire mesh and ceramic media could be used. The filter media may be single use and disposable or reusable after cleaning.

Referring now to FIG. 2B, which is a cut away of the cross section of the rectangular shaped filter 109 as shown in FIG. 2A. In FIG. 2B, the filter is shown with a closed top cap 121 with a handle, but the top cap can be closed without a handle or open and used with a closure plate as described above in FIG. 1D. The top cap 121 and the bottom cap 123 are securely attached to the media 201. Lip 212 on the top cap encloses the outer top edge of the media and inner lip 213 on the top cap encloses and secures the inner top edge of the media to the top cap 121. Outer lip 222 on the bottom cap encloses the outer bottom edge of the media and inner lip 224 on the bottom cap encloses the bottom inner edge of the media. In addition, the media is securely potted, thermally bonded, glued or otherwise firmly attached to the top and bottom caps.

Figure 1E:
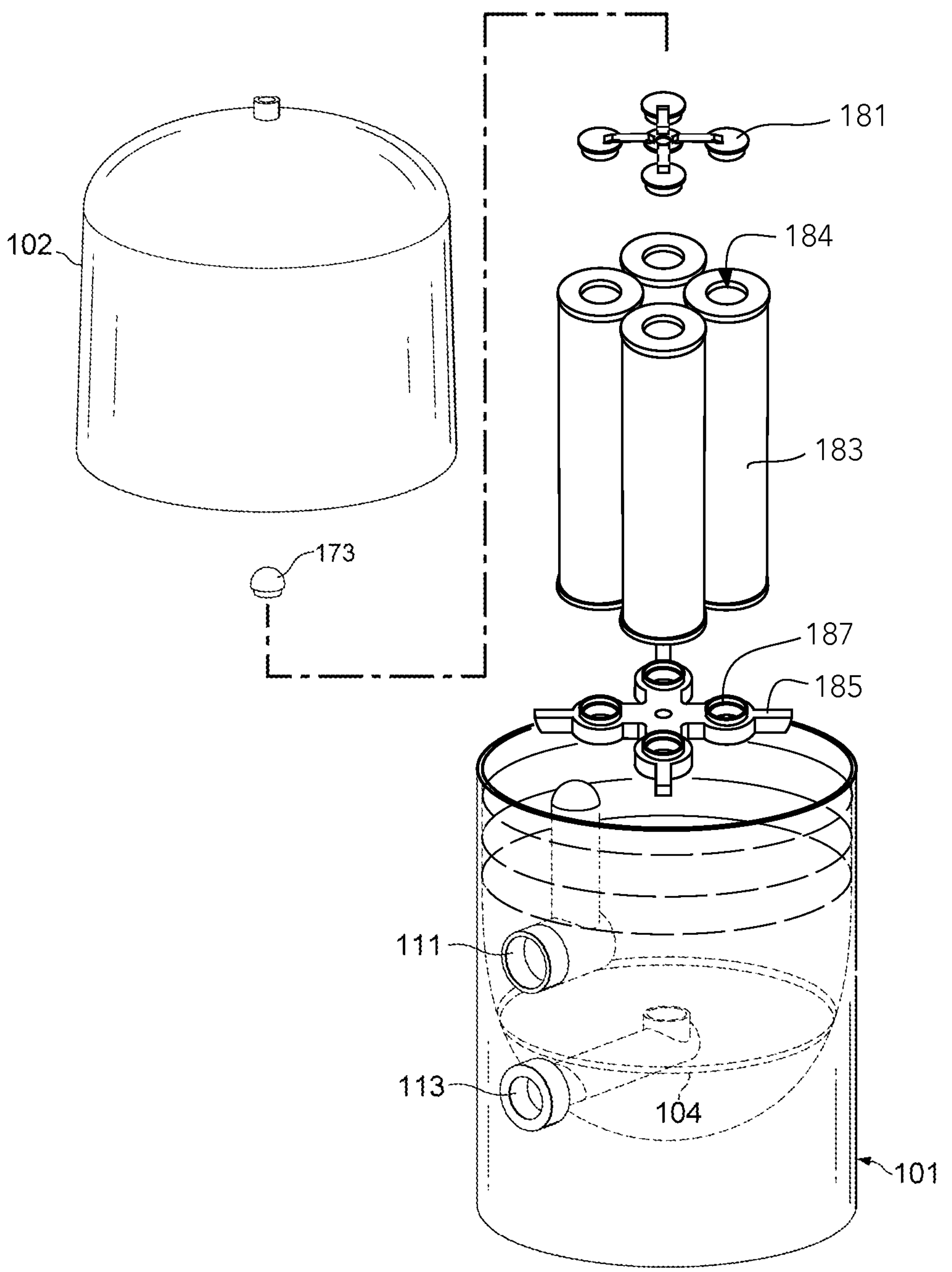
FIG. 1E is a perspective view showing a conventional filter assembly with four cylindrical filter cartridges and a manifold.

An alternative embodiment is described with reference to FIGS. 1E-1G, and similar parts will be referred to by the same reference numbers. FIG. 1E shows a conventional filter housing 101, in which four cylindrical filter cartridges 183 are located. The cylindrical filter cartridges 183 are accompanied by a matching top cap 181 to cover the top openings, and a bottom manifold 185. The bottom manifold 185 has openings 187 on its top, and the openings 187 are in fluid communication with the hollow core 184 of the filter cartridges 183. On the bottom side of the manifold 185 there is a connection port (not shown) that is sealingly coupled with the outlet nozzle 113. Channels are provided within the manifold 185 to enable fluid communication between the openings 187 and the connection port.

Figure 1F:
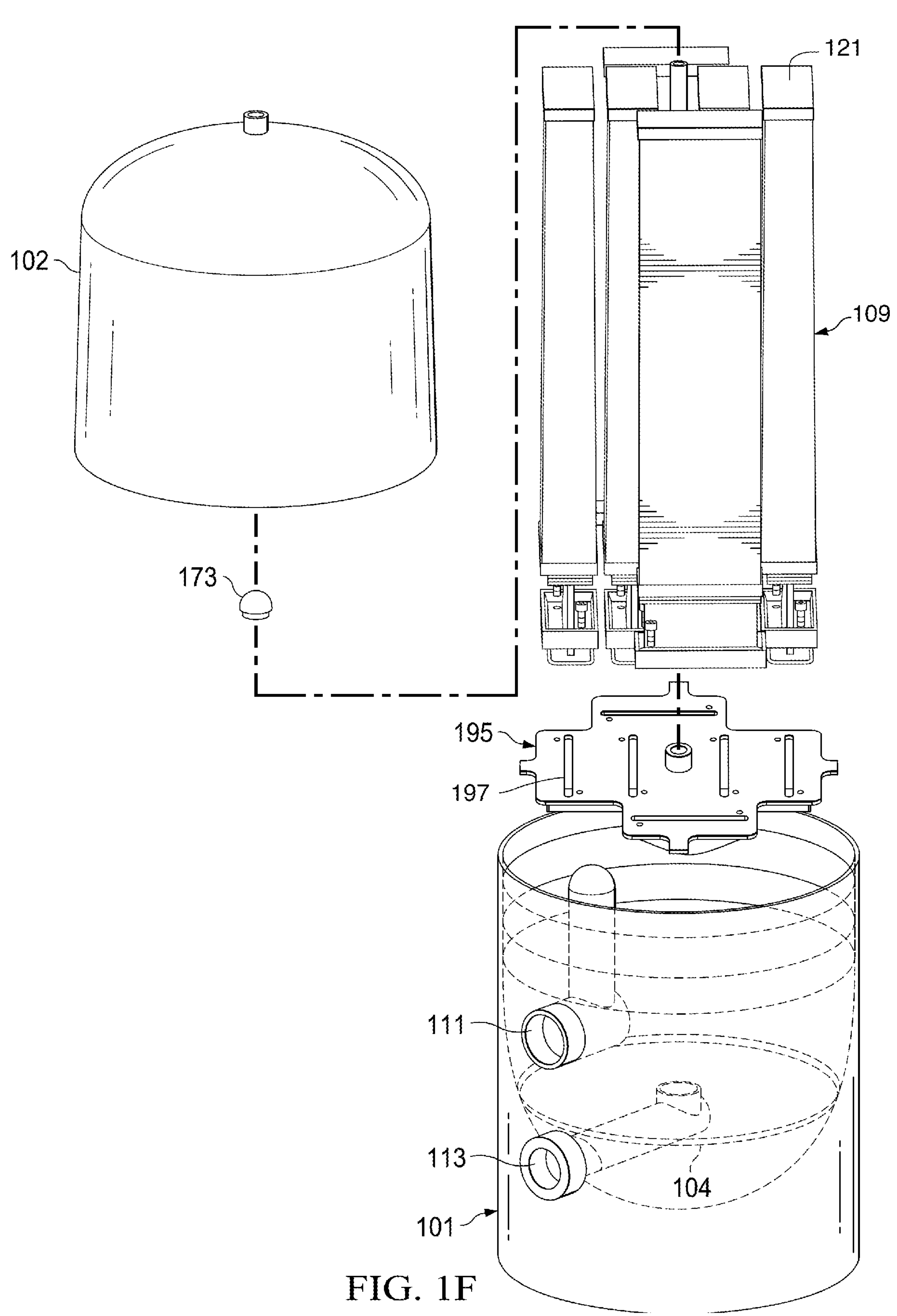
FIG. 1F is a perspective view showing an embodiment of this disclosure, in which an adaptor manifold is used along with rectangular-shaped filter elements.
Figure 1G:
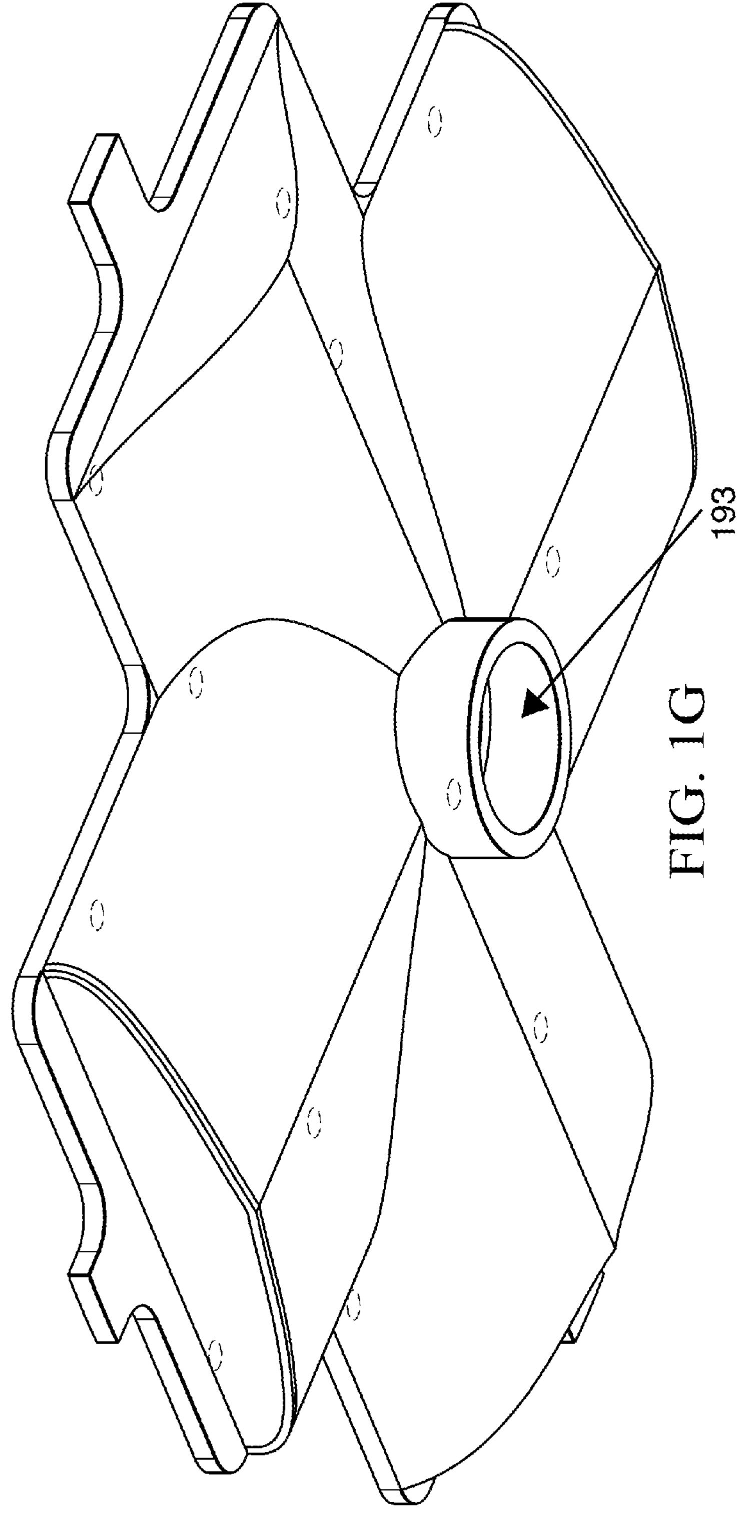
FIG. 1G is a perspective view showing the adaptor manifold.

FIG. 1F shows the adaptor manifold 195 in place of the manifold 185 in FIG. 1E. The adaptor manifold 195 is shaped to also fit inside the filter housing, and a plurality of outlet ports 197 are provided on the top side of the adaptor 195 in order to accommodate the plurality of rectangular- or wedge-shaped filter elements 109. The adaptor manifold 195 also has a connection port on the bottom side thereof (See FIG. 1G, reference number 193) that forms a sealed connection with the outlet nozzle 113. Channels are formed within the manifold 195 such that the filtered water from each of the filter elements 109 flowing through the outlet ports 197 can coalesce and exit the filter housing through the connection port to the outlet nozzle 113. Unlike cap 181 in FIG. 1E, the rectangular filter elements 109 each has a solid top cap 121, which optionally can further include a handle (not shown, discussed below with regard to FIGS. 2A-C) for ease of removal.

FIG. 2B also shows the bottom cap outlet connector 225 being inserted into the filter receiver 108 that is in turn mounted on the adaptor plate (not shown in FIG. 2C). The O-ring 226 can be provided on the bottom of filter receiver 108 to provide a secure seal with the adaptor plate. However, other secure attachments can be used as well. O-ring 165 (also shown in FIG. 1B) is provided at the bottom of the receiver 108 to prevent water leakage. Other seals or sealing mechanisms can also be used.

The media has a central void 205 which is shown in the cut away view with layers of filter media 201 shown on each side of the void 205. In the preferred embodiment the filter support 125, which is preferably perforated, is inserted in the central void 205 of the media 201 for both maintaining the physical integrity of the filter element, as well as providing flow path for the filtered fluid within the void. The perforated support 125 can be made of any rigid and light material to support the overall weight and pressure within the pleated filter media. Non-limiting examples include plastic, metals, fiberglass reinforced plastics, and ceramics.

The shape of the perforated support 125 can also be tapered, i.e. the size being gradually increased to the bottom. The advantage of this tapered support is easier removal of the filter element because the inside of the filter element 109 will be less likely interfere with the support 125 when a user is pulling the filter element upward to remove from the filter housing using the handle 121 provided on the top cap.

Referring to FIG. 2C, which shows a preferred embodiment of the rectangular shape filter element 109 of this disclosure. As shown in FIG. 2C, the rectangular shape filter element 200 has a trapezoid shaped side profile, i.e. the cross-sectional area increases from top to bottom. The outlet connector 225 is shown as an integral part of the bottom cap 123 and extending therefrom. This is different from the receiver 108 in FIG. 2B that is in turn used to engage with the adaptor plate. Also, O-ring 226 is provided on the outer circumference of the outlet connector 225 that is used to secure the rectangular shaped filter in place in adaptor plate 105.

The rectangular shaped filter elements effectively reduce the dead space created by circular filter elements. In addition, the trapezoidal shape allows easier insertion/removal of the filter elements. The rectangular shape also a can be aligned easily in rows if a specific orientation is required for the filter elements to function properly.

Figures 2D, 2E, 2F:
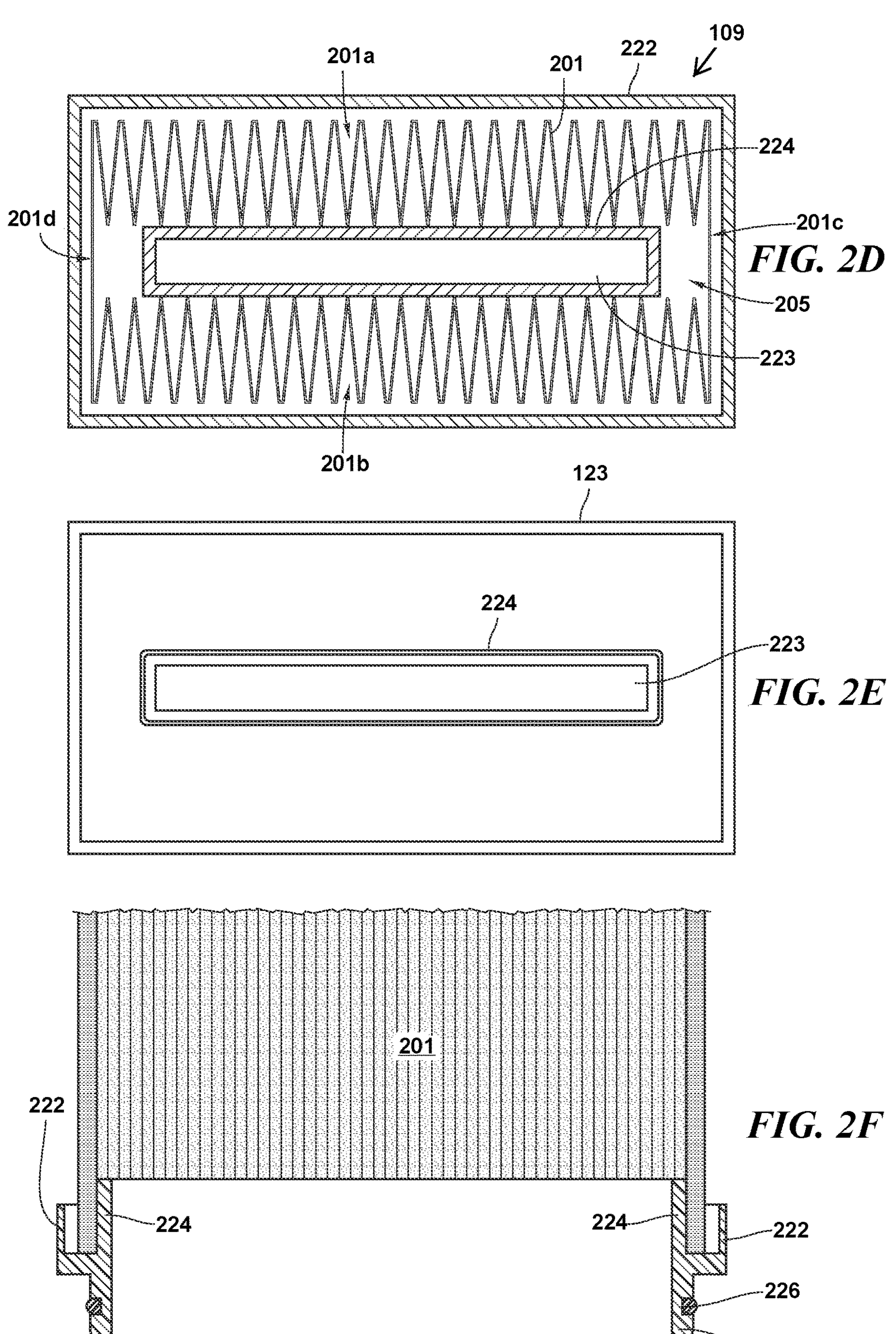
FIG. 2D is a bottom cross-sectional view of a rectangular shaped filter element of this disclosure with pleated filter shown and the bottom cap.
FIG. 2E is a bottom view of a bottom cap of a rectangular shaped filter element.
FIG. 2F is a partial vertical cross-sectional view the lower end of the rectangular shaped filter and the bottom cap.

Referring now to FIG. 2D, which shows the horizontal cross-section view near the bottom of the rectangular shaped filter element 109. The filter element 109 comprises pleated filter media 201 surrounding a central void 205 to allow the filtered fluid to flow through the pleated media and to exit from the void to an opening 223 located in the bottom cap 123. In this cross-section, it can be seen that the pleated filter media 201 can be one single sheet of filter media folded continuously around the center, forming an inside void 205, where filtered fluid flows, and the fluid collects inside the void 205 before exiting the filter element through the opening 223 on the bottom cap. The outer lip of the bottom cap is shown at 222 and the inner lip 224 is shown that enclose the ends of the media 201 (see also FIG. 2B). The pleated media extending from the rectangular shaped top cap to the rectangular shaped bottom cap with two rows of pleats 201*a* and 201*b* on the long sides of the rectangle and with a layer of media 201*c* and 201*d* on the short sides connecting 201*a* and 201*b*, creating a generally central void 205 inside the pleats. The inner lip 224 is shown in this view. The top cap 121 and bottom cap 221 maintains the rectangular shape of the filter element. In addition, a mesh (not shown) can enclose the filter media to maintain the generally rectangular shape. Alternatively, an outer band can be secured around the circumference of the filter element. The mesh can be made of a polymeric or other material that will maintain its integrity when in contact with the fluids to be filtered. Each of the filter element 109 has a top cap and a bottom cap to maintain the shape and integrity thereof. The water to be filtered flows from outside the filter element across the filter media into the central void.

Referring now to FIG. 2E, which shows a perspective view of the inside of the bottom cap 123 and the opening 223 without media. The inner lip 224 is shown defining the opening 223.

Referring to FIG. 2F, which shows a partial cross section view of the bottom section of a rectangular shaped filter element of this disclosure. This figure illustrates how the pleated filter media 201 interfaces with the bottom cap 123. Lip 222 is provided on the bottom cap to enclose the outer bottom edge of the media. Lip 224 is provided on the bottom cap to enclose the inner bottom edge of the media. The outlet connector 225 is shown on extending from the bottom cap. O-ring 226 is provided on the outer circumference of the outlet connector 225 that is used to secure the rectangular shaped filter in place on the filter receiver 108.

Figures 3A, 3B:
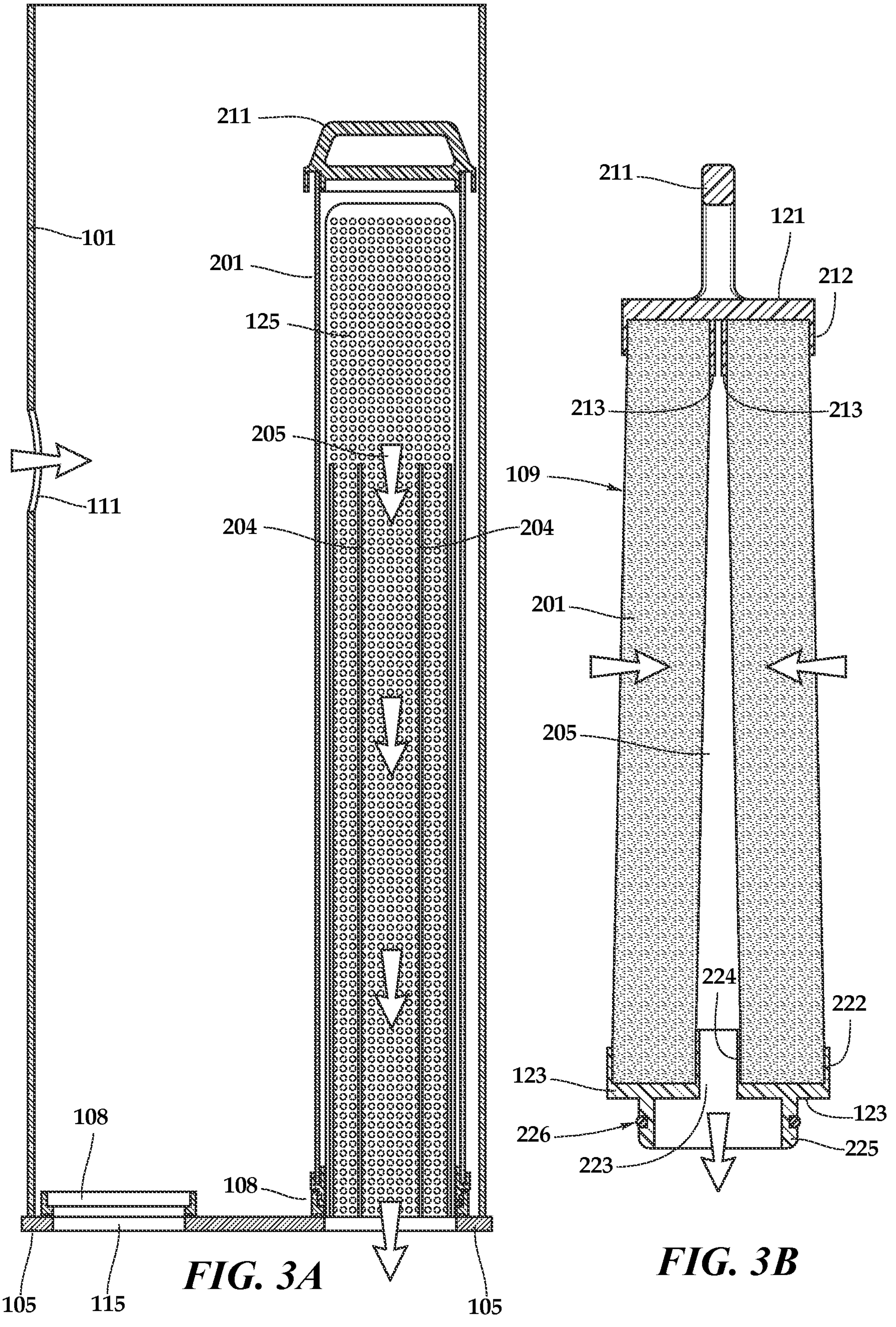
FIG. 3A is a partial cross-section showing of a filtration flow for outside to inside in filtering.
FIG. 3B is a cross section of the fluid flow with the trapezoid-shaped filter element as an example.

The filtration process will be described with reference to FIGS. 3A-E. Referring now to FIGS. 3A-B, which is an illustration of the outside to inside filtration flow using rectangular shaped filter elements. FIG. 3A only shows portions of the filter housing and the proportion may be varied for better illustration. FIG. 3B illustrates the filtration flow of the rectangular shape filter element having trapezoid profile. The water from the pool or spa is introduced through a fluid inlet 111 of the filter vessel 101 in the vessel wall. The water then flows through a layer of the filter media 201 of one of the rectangular shaped filters, and the clean fluid flows through the central void 205 inside the filter media (indicated by the flow arrows in the drawing) which void 205 has the perforated support 103 inserted therein. The fluid then flows through the opening 223 in the bottom cap 123 that communicates with the filter receiver 108 mounted on adaptor plate 105. This view also shows optional stiffeners 204 mounted on the bottom face of the filter receiver 108 to provide additional stability to the perforated support 125. The outlet cap 225 of the bottom cap of each of the rectangular shaped filters is inserted in the upwardly projecting lips on the filter receiver 108 mounted on the top of adaptor plate. The opening in the bottom cap communicates with a corresponding outlet port 115 in the adaptor plate 105, thus providing fluid communication from the central void 205 with the filtered fluid through the adaptor plate to the chamber below in the filter housing.

This is an outside to inside flow direction, where the filter opening 223 for the filtered fluid is located at the bottom cap 123 of the filter element 200. The fluid flows from outside of the filter media 201 to the center void 205, and eventually exits the rectangular shaped filter 109 through the filter opening 223 in the bottom cap. The bottom cap outlet connector 225 is secured into the filter receiver 108 on the adaptor plate via the O-ring 226. The O-ring 226 can provide a better seal between the bottom cap 123 and the filter receiver 108 to avoid fluid bypass. Also, the O-ring or gasket seal can provide a resistance signal for the user that once the resistance is overcome, the filter element is installed in place.

Conventional housings can be retrofitted with a new adaptor plate of the current invention to accommodate rectangular shaped filters above the adaptor plate used for cylindrical filters. The new adaptor plate should have the correct outer diameter to fit inside the filter housing and accommodate the length of filter elements can fit into the housing.

Figures 3C, 3D, 3E:
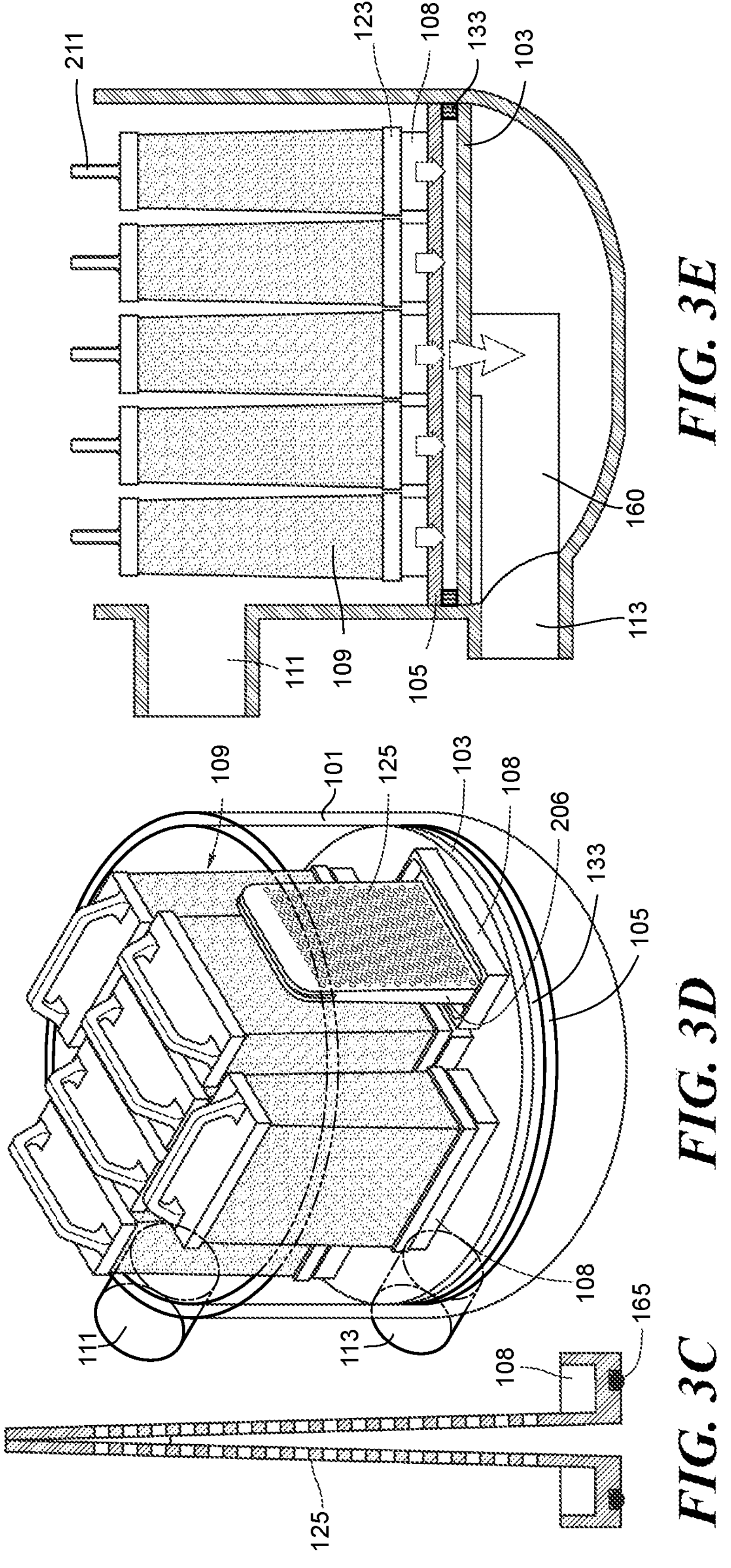
FIG. 3C is a cross sectional view of the filter support.
FIG. 3D is a schematic view of the trapezoid-shaped filter elements inside a filter housing with flow-direction outside to inside.
FIG. 3E is a longitudinal cross-sectional view in the filter housing of the filter of FIG. 5A showing the filter.

FIG. 3C is a cross-section of the of perforated support 125 showing a preferred embodiment that is made of two perforated rectangular rigid sheets mounted on either side of the opening in the filter receiver 108 so as not to impede the filter flow. The tops of the perforated sheets meet. Narrow side panels 206 are between the perforated sheets extending from the top of the filter receiver 108 to the top of the perforated sheets (see FIG. 3D).

In a preferred embodiment, additional stiffeners 204 as shown in FIG. 3A are provided between the perforated sheets and are mounted on top of the filter receiver 308 inside the perforated support 125. The O-ring 165 on the bottom of the filter receiver is shown in this view. It is noted that the wedge-shaped filter elements operate in a similar fashion, and the following discussion will use the rectangular shaped filter element and matching adaptor plate as examples. The more detailed discussion on wedge-shaped filter element can be found in U.S. application Ser. No. 16/112,023, which is incorporated in its entirety for all purpose.

Referring to FIG. 3D, which is a schematic view of a filter assembly having the rectangular filter elements 200 as installed in a filter housing 101. For ease of reference only seven (7) rectangular filters are shown in the schematic. The number of filter elements 109 in this figure is only for illustrative purpose, and the actual number of filter elements 109 will depend on many factors, such as the size of the filter housing, the fluid flow rate, the particulates to be filtered, and the nature of the fluid. One filter element has been removed to show the construction of the filter assembly with a perforated support 125. The adaptor plate 105 has a plurality of filter receivers 108 to receive the bottom caps 123 of the rectangular shaped filters 109 with openings (not shown) matching the filter opening in the bottom caps 123 for each filter element 109. Also, the perforated support 125 is mounted to and extending from the filter receiver 108, and this configuration also facilitates installation and removal of individual filter elements 109 because the perforated support 125 also serves as a "guiding rail" matching the center void (not shown here) of each filter elements 109. The perforated supports 125 are mounted on the filter receivers 108 without impeding the fluid flow through the outlet ports (see FIG. 1B).

This configuration for outside-in flow is also shown in FIG. 3E. This view does not show the removable top 102 of the filter vessel that is secured during the filtration process. The lid may be removed to replace and/or clean the rectangular shaped filters aided by the use of a handle to place and remove the filters. Also the trapezoidal shape of the filter is helpful in removal, because the wider base of the filter is not impeded by the rectangular support, making it easier to reach the pleats and clean the filters. At the start of filtration, the fluid to be filtered is introduced through the dirty fluid inlet 111 into an empty filter vessel, and then fills the filter vessel from the adaptor plate 205 upwards. When the fluid level reaches the filter media 201, the fluid flows across the filter media 201 and into the center void of the filter elements 109. The filtered fluid that has passed through the filter media then flows through the outlet openings (223 in FIG. 2E) in the bottom caps 123 of filter elements 109, through the corresponding openings in the filter receivers 108, and through the outlet ports (115 in FIG. 1B) on the adaptor plate 105, and eventually exiting the filter housing through a outlet pipe 160 that is fluidically connected to the clean fluid outlet nozzle 113 at the bottom of the filter vessel.

In addition, the increased number of filtered fluid openings in the adaptor plate effectively reduces the pressure drop across the filter, therefore also increases the filter efficiency. As well known in the field, excessive pressure drop adversely affects a filter's performance. Therefore, by increasing the flow-through space on the adaptor plate, it is possible to achieve an optimal level of pressure drop for better filter performance. Additionally, lower starting pressure drop allows for longer filter life and lower energy consumption to perform the filtration. Increased filtration surface allows for higher flow rate, thus enabling faster pool cleaning.

As can be seen in FIGS. 3D and 3E, the profile of each filter element is designed so that the dead space within the filter housing is kept to a minimum with multiple rectangular shaped filters. The space not occupied by the filter elements allows the dirty fluid to flow inside the housing, but does not create undesirable turbulent flow. The top caps 121 and bottom caps 123 do not prevent fluid from passing through the longitudinal axis of the filter media 201. The tapered or trapezoidal shape aids in providing a flow path to all of the media without creating turbulent flow. This configuration also maximizes the filtration surface area provided by each rectangular shape filter element with the novel configuration of pleated filter media.

As described herein, the rectangular-shaped filter element and retrofitting a plurality of rectangular shaped filters in a cylindrical filter housing to achieve a more efficient filtration is preferred. However, a wedge-shaped filter element can be used. The rectangular or wedge-shaped filters can be used in the standard size cylindrical filter housings as used in filtering pool or spa water, but can also be manufactured to any size desired. The size of the filters shown herein is for illustrative purposes. Filter housings that are manufactured to accommodate cylindrical filters can be retrofitted to accommodate a plurality of rectangular shaped filter elements.

Figures 4A, 4B, 4C:
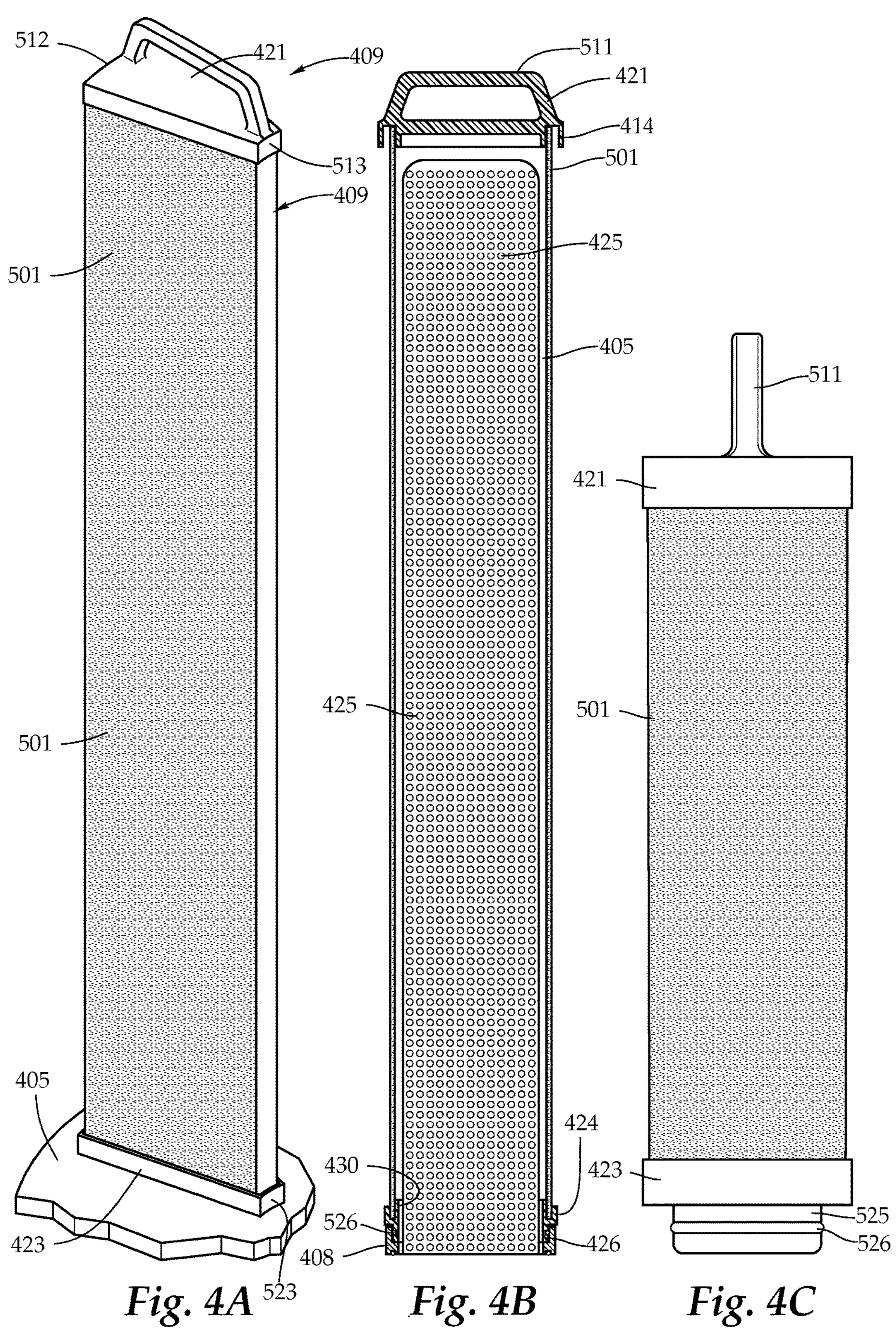
FIG. 4A is a schematic perspective view of a wedge-shaped filter element of this invention.
FIG. 4B is a cut away cross section wherein pleated filter media is cut out to reveal the perforated support.
FIG. 4C is a side view of a wedge-shaped filter element showing the top cap and the bottom cap with the attachment to the separation plate.

An alternative embodiment using wedge-shaped filter elements is now described with reference to FIGS. 4A-J. FIG. 4A shows a perspective view of the alternative wedge-shape filter element 409 of this disclosure. As seen in FIG. 4A, the wedge-shaped filter element 409 generally comprises a top cap 421 (shown in this view with a handle 511), a bottom cap 423, and the filter media 501 that may be pleated and extends from the top cap 421 to the bottom cap 423. Also referring to FIGS. 4D, the top and bottom caps may have curved outer edges 512 and 522 as shown in FIG. 5D and shorter curved inner edges 513 and 523 respectively. In FIG. 4A part of the adaptor plate 405 is generally shown that is located inside the filter vessel on which the wedge-shaped filter element 409 is mounted is shown and will be discussed in further detail below.

Referring now to FIG. 4B, which is a cut away cross-sectional view of the wedge-shaped filter element of this disclosure, part of the pleated filter media is cut out to view the perforated support 425. The perforated support 425 is secured to and extends upwardly from and is secured to an adaptor plate in the filter vessel. As discussed with regard to FIG. 4D below, the pleated filter media has a void 530 in the middle where this perforated support 425 is located for both maintaining the physical integrity of the filter element, as well as providing flow path for the filtered fluid within the void in the filter media. The perforated support 425 can be made of any rigid and light material to support the overall weight and pressure within the pleated filter media. Non-limiting examples include plastic, reinforced plastic, ceramics and metals.

One layer of pleated media 501 is shown in the cross section that is part of the continuous pleated media surrounding the perforated support 425.

The bottom cap 423 is shown in cross section and has an outer lip 424 that extends upward to enclose the bottom edge of the pleated media 501. The top cap 421 also has an outer lip 414 that extends downward and encloses the upper edge of the pleated media 501. The ends of the filter media abuts the inside of each of the caps and is secured with an adhesive, potting resin or compounds or any other type of bonding known to those skilled in the art, or the cap can be formed directly on the pleated media by a resin or plastic without using any adhesive. FIGS. 4A and 4B show bottom cap 423 that includes an outlet connector 525 with O-ring 526. The outlet connector 525 that extends from bottom cap 423 is sealably received and secured in filter receiver 408 that is shown as a wedge-shaped lip extending upwardly from the adaptor plate 405. When the wedge-shaped filter element is placed over the perforated support 425, the bottom cap 423 is secured on the adaptor plate 405 via the O-ring 228 into the filter receiver 408, ensuring that the effluent can flow from the void 430 through the opening in the adaptor plate. Other secure attachments can be used as well.

Figures 4D, 4E:
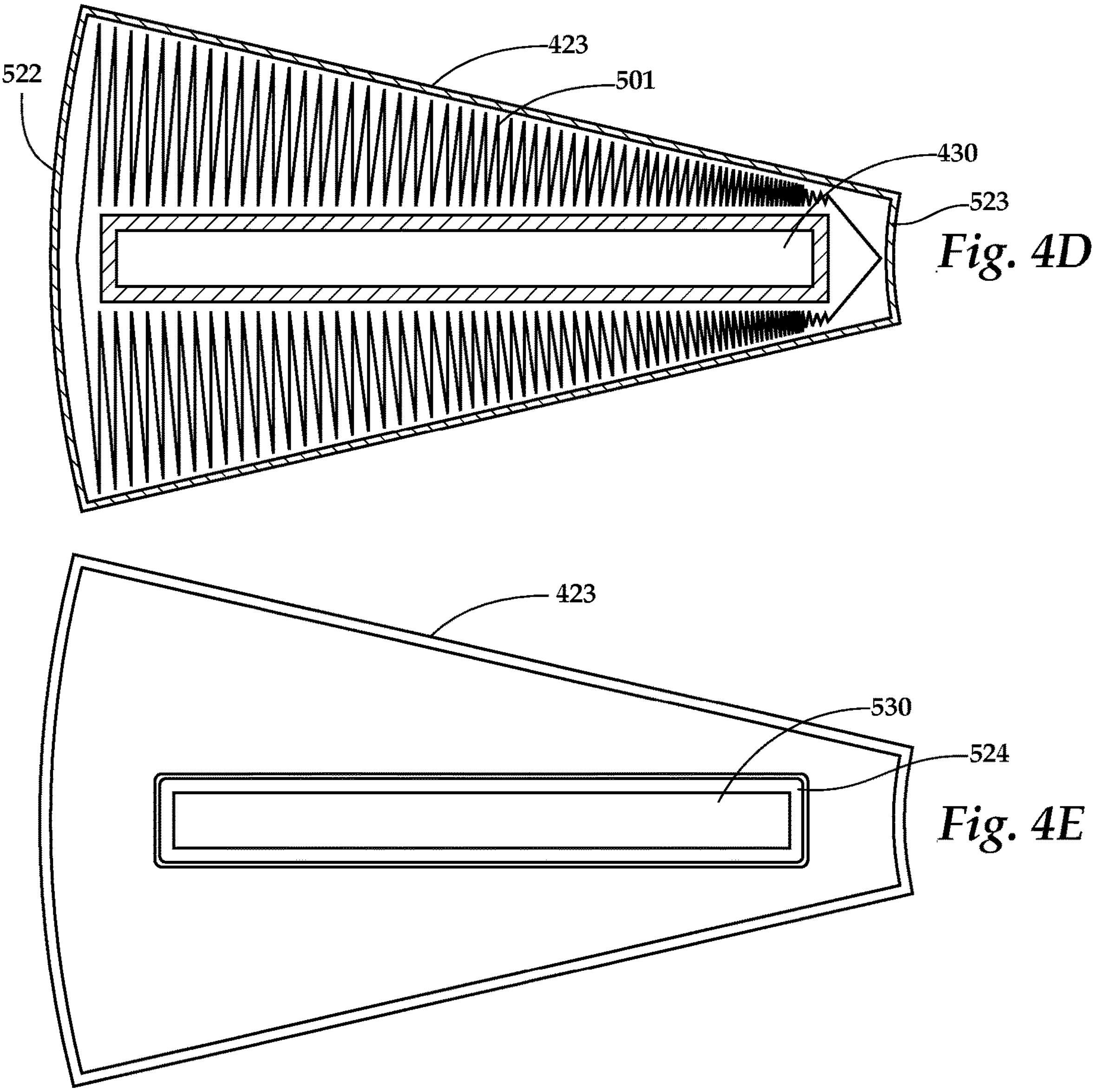
FIG. 4D is a cross-sectional view of a wedge-shaped filter element and bottom cap with pleated filter shown as it sets in the cap.
FIG. 4E is a bottom view of a bottom cap of a wedge-shaped filter element of this disclosure.

FIG. 4D is a horizontal cross section near the bottom of the wedge-shaped filter element showing the pleated filter media 501 with the pleat size that increases in width toward the longer end of the wedge-shaped filter element to increase filtration area and filtration capacity. In this cross-section, it can be seen that the pleated filter media 501 can be one or more sheets of filter media folded continuously around the center forming an central inside void 430, into which the filtered fluid flows from outside to inside flow, and the fluid and remains inside the void 430 before exiting the filter element through an opening 530 in the bottom cap 423. The pleated media extends from the wedged shaped top cap to the wedge shaped bottom cap with two rows of pleats gradually decreasing in size from larger to smaller pleats from the outer side of the wedge to the smaller inner side of the wedge with a layer of media connecting the outer most largest pleats to the smallest inner pleats providing a generally central void inside the pleats.

Referring now to FIG. 4E, which shows a perspective view of the inside of the bottom cap 423 and the opening 530 without media. The bottom cap has an inner lip 524 defining the opening 530 that the media surrounds. The top cap 421 and bottom cap 423 maintains the wedge shape of the filter element. The ends of the filter media abuts the inside of each of the caps and is secured with an adhesive, potting resin or compounds or any other type of bonding known to those skilled in the art.

Figure 4F:
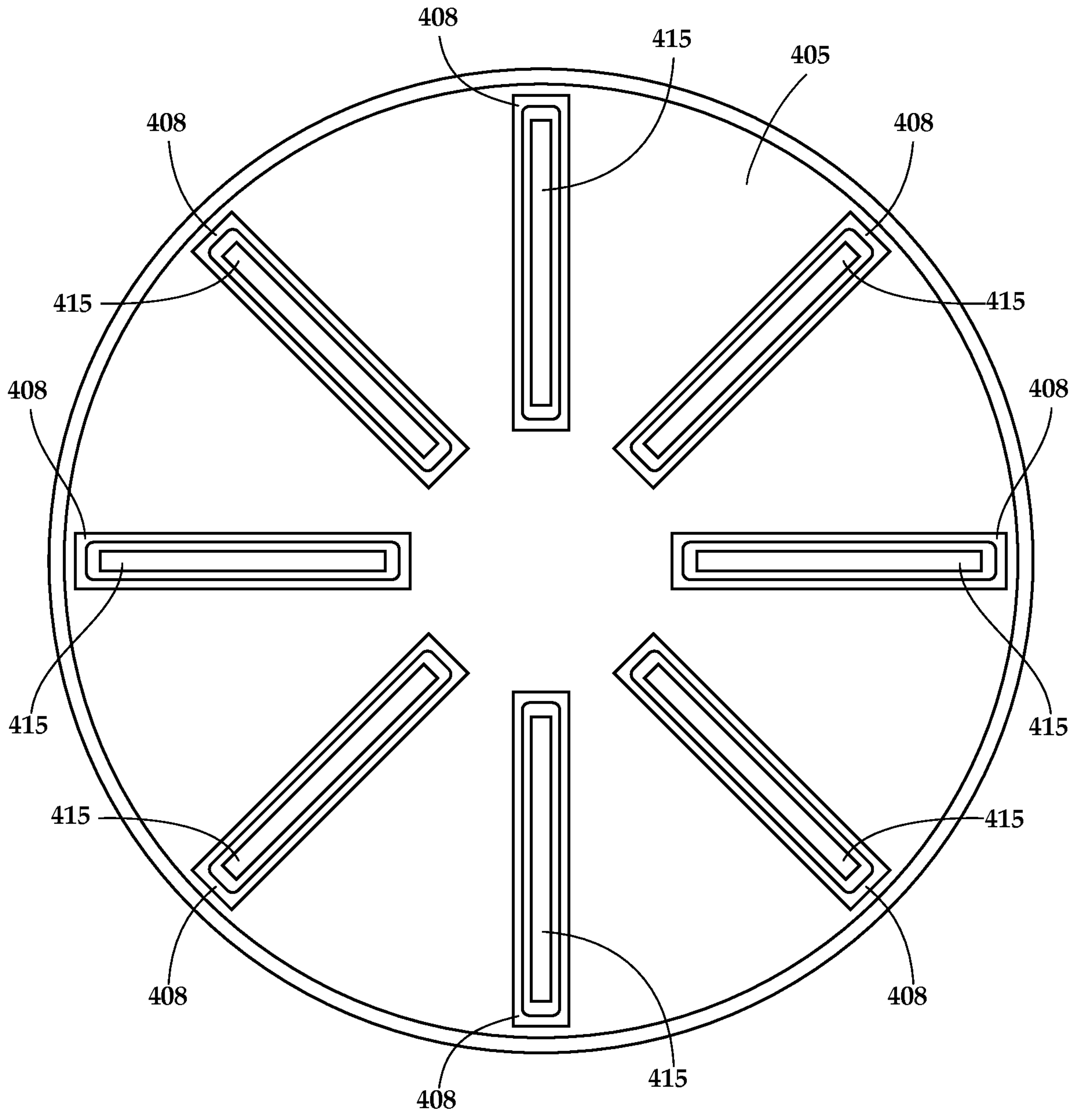
FIG. 4F is a top view of an adaptor plate of this disclosure for wedge-shaped filters.

FIG. 4F is a top perspective view illustration of the adaptor plate 405 that is securely mounted inside a filter vessel with eight (8) filter receivers that sealably receive the outlet connectors 525 on the bottom caps of each of eight (8) wedge shaped filter elements. There are eight (8) filter receivers 408 that also define outlet ports 415 for each of the openings 430 in the bottom caps for the wedge-shaped filter elements.

Figure 4G:
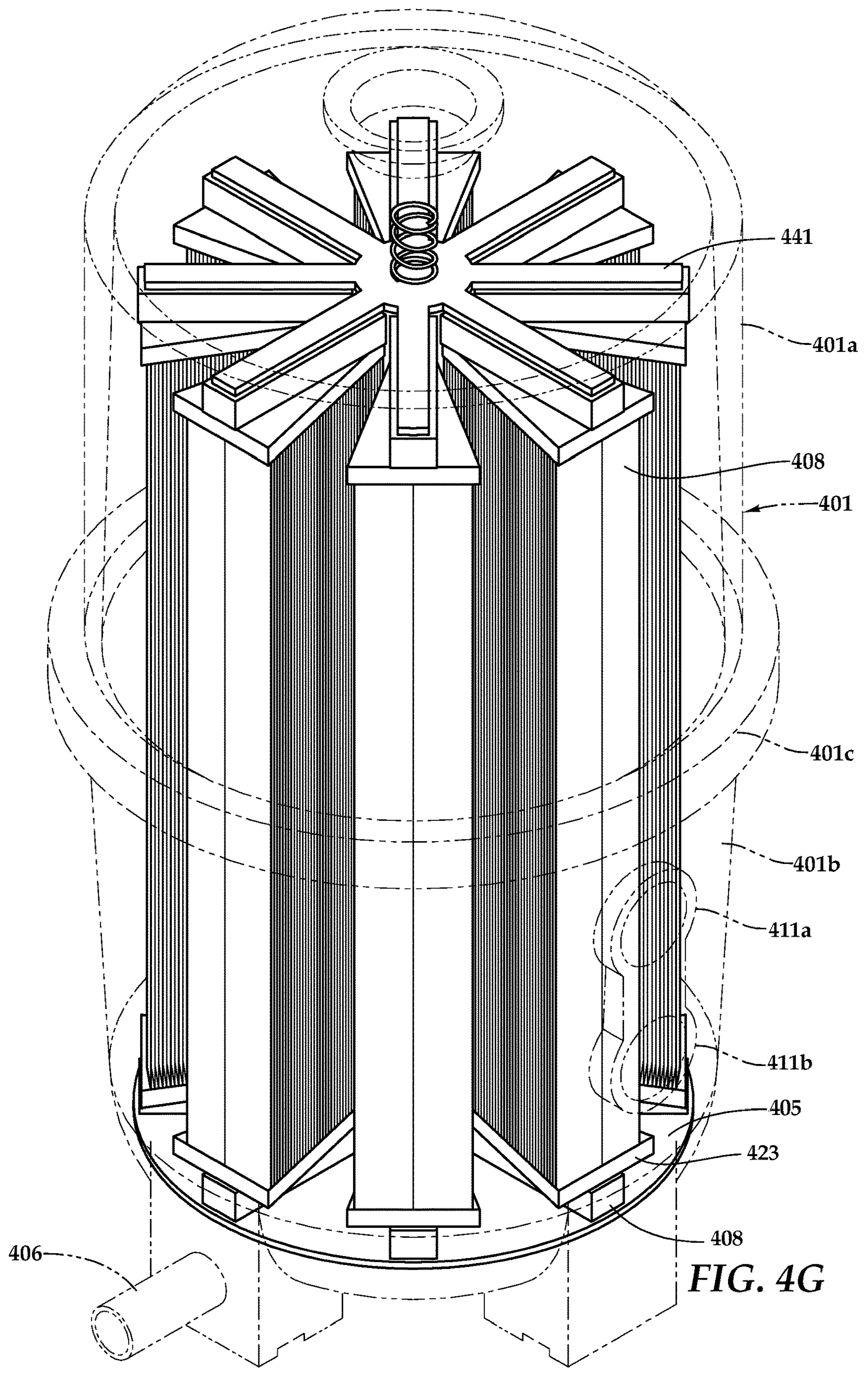
FIG. 4G is an alternative embodiment of the disclosure with a spider plate shown that can be used with a swimming pool or spa filter housing.

FIG. 4G is another embodiment of the outside in flow that can be adapted for uses including swimming pool filters and other applications. The filter housing 401 is shown with a series of wedge-shaped filter elements (one of which is indicated at numeral 408) arranged under a spider plate 441. Instead of or in addition to the top caps for each of the wedge-shaped filter elements, a single spider plate 441 is used. The spider plate 441 has a central hub with radiating arms that are securely placed over each of the wedge-shaped filter elements inside filter housing. The fluid flow is outside to inside flow as previously described with respect to the rectangular shaped filter elements. Typically the filter housings for swimming pools are in two pieces with the top housing 401*a* and the bottom portion of the housing 401*b* that are secured together in a tight circumferential seal at 401*c*. The top housing 401*a* can be removed after the fluid is drained from the housing to access the filters. The fluid, which in the case of swimming pools would be water, enters typically through two inlets 411*a* and 411*b* located on the bottom portion of the housing 401*b*. The water flows through the wedge shaped filter elements from outside to inside and is collected in the central voids and the effluent or clean water flows though the fluid outlets of each wedge shaped filter element in the bottom cap, one of which is referenced as numeral 423, that are in communication with the internal void of the wedge shaped filter elements and also communicate through openings in the adaptor plate. The wedge-shaped filter element bottom cap is inserted sealably into bottom cap receiver 408 on the adaptor plate 405, which can be placed closely on top of a separation plate (not shown) that was previously used for the single cylindrical filter cartridge. The clean filtered water accumulates under the adaptor plate 405 and exits the filter housing 401 through outlet 406.

Table 1 compares various parameters for cellulose pleated media rectangular shaped filters compared to cylindrical filters in filter vessels with typical diameters. The data is for cellulose pleated media, but the results of natural media or synthetic polyester media are expected to be equivalent and have the same or similar benefits of cellulose. The rectangular shaped filters are better in every regard including the number of filters contained in the vessel, the total filter media surface. The increase in media surface is proportional to the increase in filter efficiency.

TABLE 1

Comparison of Rectangular Filter to Cylindrical Filter Cartridges with Natural Media Cellulose

| Vessel Diameter (inches) | 18 | 24 | 30 | 36 | 42 | 48 |
|---|---|---|---|---|---|---|
| Conventional Cylindrical Filters cartridge per vessel diameter (#) | 4 | 8 | 13 | 21 | 29 | 37 |
| Rectangular Filters per vessel diameter (#) | 6 | 11 | 19 | 30 | 38 | 50 |
| Conventional cylindrical filter cartridge surface area ($ft^2$) | 272 | 544 | 884 | 1428 | 1972 | 2516 |
| Rectangular Filter Surface Area per Vessel Diameter ($ft^2$) | 750 | 1375 | 2375 | 3750 | 4750 | 6250 |
| Surface area ($ft^2$) increase Rec. Filters over Cylindrical Filter (%) | 176% | 153% | 169% | 163% | 141% | 148% |
| Surface area ($ft^2$) increase Rec. Filters over Cylindrical Filter by multiple (×) | 2.76× | 2.53× | 2.69× | 2.63× | 2.41× | 2.48× |

The same data is presented in Table 2 for pleated polypropylene media. The same or similar results can be expected for other synthetic media.

TABLE 2

Comparison of Rectangular Filter to Cylindrical Filter Cartridges with Multi-layered Synthetic Media

| Vessel Diameter (inches) | 18 | 24 | 30 | 36 | 42 | 48 |
|---|---|---|---|---|---|---|
| Conventional Cylindrical Filters cartridge per vessel diameter (#) | 4 | 8 | 13 | 21 | 29 | 37 |
| Rectangular Filters per vessel diameter (#) | 6 | 11 | 19 | 30 | 38 | 50 |
| Conventional cylindrical filter cartridge surface area ($ft^2$) | 248 | 496 | 806 | 1302 | 1798 | 2294 |
| Rectangular Filter Surface Area per Vessel Diameter ($ft^2$) | 507 | 930 | 1606 | 2535 | 3211 | 4225 |
| Surface area ($ft^2$) increase Rec. Filters over Cylindrical Filter (%) | 104% | 87% | 99% | 95% | 79% | 84% |
| Surface area ($ft^2$) increase Rec. Filters over Cylindrical Filter by multiple (×) | 2.04× | 1.87× | 1.99× | 1.95× | 1.79× | 1.84× |

Figure 5:
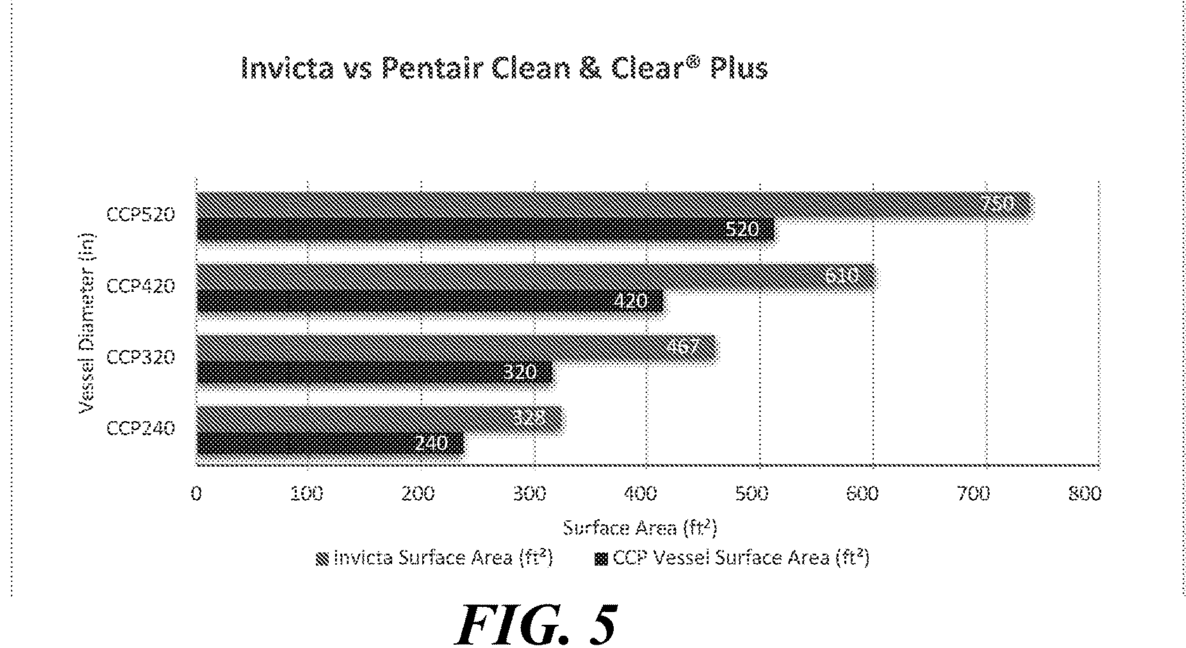
FIG. 5 is a comparison between the configuration of multiple filter elements for pool and spa application of this disclosure and a conventional filter configuration using Pentair Clean & Clear® Plus filter elements.

Table 3 shows the filtration performance using the adaptor plate of this disclosure to install multiple rectangular filters as compared to conventional cylindrical cartridge filter design of different length. Specifically, Clean & Clear® Plus filters of different lengths as used in conventional pool filter system, where the numbers denote the length of the filter cartridge. The results are also shown in FIG. 5.

TABLE 3

Comparison of filter performance

| Pentair Vessel Model | Vessel Flow Rate Rating (gpm) | Cartridge Length (in) | CCP Vessel Surface Area ($ft^2$) | CCP Filter Flux Rate ($gpm/ft^2$) | Invicta Filter Surface Area ($ft^2$) | Invicta Surface Area ($ft^2$) | Invicta Area Increase (%) | Invicta Flux Rate ($gpm/ft^2$) | Invicta Flux Rate Reduction (%) |
|---|---|---|---|---|---|---|---|---|---|
| CCP240 | 90 | 14.055 | 240 | 0.38 | 56.2 | 337.3 | 40.6% | 0.267 | 28.9% |
| CCP320 | 120 | 20.000 | 320 | 0.38 | 80.0 | 480.0 | 50.0% | 0.250 | 33.3% |
| CCP420 | 150 | 26.125 | 420 | 0.36 | 104.5 | 627.0 | 49.3% | 0.239 | 33.0% |
| CCP520 | 150 | 32.125 | 520 | 0.29 | 128.5 | 771.0 | 48.3% | 0.195 | 32.6% |

As can be seen in Table 3 and FIG. 5, the filter system of this disclosure has 37%, 46%, 45% and 44% surface area increase comparing to CCP240, CCP320, CCP420 and CCP520, respectively. This shows that for the same filter housing, by retrofitting with the adaptor plate and rectangular/wedge shaped filter elements of this disclosure, a significantly improved filter efficiency can be achieved.

There is more than a 50%-75% increased orifice area for fluid flow for the rectangular shaped filters, which translates into lower overall differential pressure. The greater cross-sectional open area in the adaptor plate in the cylindrical housing using the rectangular element results in lower pressure drop across the adaptor plate as well as more open area for additional flow if so desired. A lower starting differential pressure allows a longer operation cycle between replacing filter elements. For example, assuming a conventional filter vessel using circular filter elements where the starting differential pressure is 5 PSID and the maximum pressure being 35 PSID, this means there is a 30 PSID window for impurities to accumulate on the filter media. However, if the starting differential pressure can be reduced to 2 PSID by the trapezoid shaped filter elements, then the window is expanded by 3 PSID, which means longer operational life before the filter elements need to be replaced.

Table 4 shows the comparison of turnover capacity between the conventional cylindrical filters (CCP240, CCP320, CCP420, CCP520 on the left half) and the adaptor manifolds with rectangular or wedge-shaped filter of this disclosure (Invicta filters on the right half).

TABLE 4

Comparison of Turnover Capacity

| Pentair Vessel Model | Vessel Flow Rate Rating (gpm) | CCP Turnover Capacity (gallons) 8 hours | CCP Turnover Capacity (gallons) 10 hours | CCP Turnover Capacity (gallons) 12 hours | Invicta Vessel flow rate rating (gpm) | Invicta Turnover Capacity (gallons) 8 hour | Invicta Turnover Capacity (gallons) 10 hours | Invicta Turnover Capacity (gallons) 12 hours | Invicta Turnover Capacity increase (%) |
|---|---|---|---|---|---|---|---|---|---|
| CCP240 | 90 | 43,200 | 54,000 | 64,800 | 126 | 60,718 | 75,897 | 91,076 | 40.55% |
| CCP320 | 120 | 57,600 | 72,000 | 86,400 | 180 | 86,400 | 108,000 | 129,600 | 50% |
| CCP420 | 150 | 72,000 | 90,000 | 108,000 | 235 | 112,860 | 141,075 | 169,290 | 56.75% |
| CCP520 | 150 | 72,000 | 90,000 | 108,000 | 289 | 138,780 | 173,475 | 208,170 | 92.75% |

As can be seen in Table 4, the turnover capacity using the adaptor manifold and rectangular/wedge shaped filter of this disclosure has at least 40.55% increase over the conventional cylindrical filters, and can have as much as 92.75% increase, almost doubling the turnover capacity in the CCP520 vessel model. This increase in turnover capacity again indicates that the adaptor manifold and rectangular/wedge shaped filters of this disclosure can provide more efficient filtration for pool and spa applications. Additionally, a smaller vessel can be used for a larger pool. For example. A CCP320 vessel with Invicta can be used in place of the larger CCP420 vessel while still providing equal or greater performance as compared to the conventional cylindrical filter design.

The differential pressure is the main driving force for fluid flow inside the filter housing. The fluid would flow along the path of least resistance, which generally starts at the bottom of the filter elements as the filter vessel fills up with fluid. This fluid flow continues, but as the filter media accumulates impurities toward the bottom of the filter element, the differential pressure at that location increases as well. As soon as the differential pressure is higher than other parts of the filter element, fluid flow would change direction to the lowest resistance, even if the differential is only 0.01 PSI. This dynamic fluid flow, along with the more compact interior inside the filter housing allows less turbulent flow, more even flow throughout the entire filter element and surface area at one time. The additional surface area provided by this novel shape reduces the face velocity of the fluid through the filter media. This lower face velocity results in less resistance or pressure drop across the media allowing for the lower pressure drop and increased dirt and particulate loading capacity in the filter elements. The benefits in additional dirt and particulate holding capacity is due to lower face velocities that are understood by one skilled in the art.

For example, Darcy's law provides that flux rate (J) is used to measure a filter's efficiency, being defined as $$J = \frac{\Delta P}{(R_m + R_c)\mu}$$

in which:

J: liquid flux

ΔP: trans-filter media pressure

Rm: resistance of the filter media

Rc: resistance of the filter cake

μ: liquid viscosity

NSF is the regulatory agency for pool and spa filters, and NSF 50 is the standard for design and testing the filters. NSF 50 dictates a maximum flux rate of 0.375 gpm/sq ft. It is known that the lower the flux rate, the less energy is required to drive the fluid through the filter due to the lower pressure loss across the filter. Lowering the flux rate can also increase life of the filter. Alternatively, if one opts to increase the flux rate of the filter system of this disclosure up to the maximum 0.375 gpm/$ft^2$, the footprint and size of the filter housing can be reduced.

As shown in Table. 3, the filter system of this disclosure also has 28.9%, 33%, 33%, and 32.6% flux rate reduction comparing to CCP240, CCP320, CCP420 and CCP520, respectively. This again shows the retrofitting filter system of this disclosure provides better filtration efficiency as compared to the conventional pool filter system.

Another advantage of the disclosure is the possibility of having a lower profile filter vessel that will be more attractive in a garden setting that is often the setting of a pool or spa. The more efficient filtration would allow for the use of a shorter filter vessel that has the filtration capability of a taller conventional filter. The shorted filter vessel can be placed more easily behind shrubbery or landscaping features. Also, the short filter vessel will be easier to access. Moreover, the use of guide supports with the filter elements allows for the possibility to configure the filter housing horizontally if desired.

What is claimed is:

1. A filter assembly for filtering liquids, comprising:

a) a filter housing;

b) a dirty fluid inlet to said filter housing;

c) a clean liquid outlet from said filter housing beneath a separation plate for separating dirty fluid from clean fluid;

d) said separation plate located inside said filter housing between said dirty fluid inlet and said clean liquid outlet, said separation plate having at least one opening in communication with said clean fluid outlet;

e) an adaptor plate secured to an inner circumference of said filter housing between said dirty fluid inlet and said separation plate, wherein said adaptor plate has a plurality of openings and a plurality of perforated supports mounted thereon corresponding to each of said openings, and wherein at least one spacer is provided between said separation plate and said adaptor plate;

f) a plurality of rectangular shaped filters of pleated filter media enclosed in said filter housing mounted on said adaptor plate towards said dirty fluid inlet, wherein each of said rectangular shaped filters has a central void surrounded by an inner surface of said pleated filter media, a solid first end cap, a second end cap having an opening located therein to communicate with said central void in said pleated filter media, wherein each said central void extends from said solid first end cap to said second end cap, and each said rectangular shaped filter individually surrounds each of said plurality of perforated supports extending from said adaptor plate;

g) each said second end cap of each said rectangular shaped filter is removably mounted on said adaptor plate with a sealing member that avoids liquid bypass, wherein said adaptor plate has openings corresponding to said openings in said second end caps, such that a dirty liquid to be filtered passes from an external surface of said pleated filter media into said central void of said rectangular shaped filters and thereby becomes filtered clean liquid, and said filtered clean liquid passes through said openings on said second end caps into said corresponding openings in said adaptor plate; and h) a chamber provided in said filter housing below said separation plate to collect said filtered clean liquid before said filtered clean liquid exits said clean liquid outlet.

2. The filter assembly of claim 1, wherein each said rectangular shaped filters has a generally trapezoidal cross-sectional area increasing toward a bottom of each said rectangular shaped filters.

3. The filter system of claim 1, wherein each said first end cap is solid and further comprises a handle on a top of each said first end cap.

4. The filter assembly of claim 1 wherein said pleated filter media is synthetic pleated filter media.

5. The filter assembly of claim 1, wherein said filter housing is generally cylindrical and said separation plate and said adaptor plate are generally circular and mounted inside said inner circumference of said filter housing.

6. The filter assembly of claim 1, wherein said filter assembly is operable under a range of differential pressure from 13.78 to 241.31 kPa (2 to 35 psid).

* * * * *